(12) United States Patent
Mihira

(10) Patent No.: US 12,219,102 B2
(45) Date of Patent: Feb. 4, 2025

(54) INFORMATION PROCESSING SYSTEM, INFORMATION PROCESSING APPARATUS, CONTROL METHOD EXECUTED BY THE SAME, AND STORAGE MEDIUM

(71) Applicant: CANON KABUSHIKI KAISHA, Tokyo (JP)

(72) Inventor: Yoshiro Mihira, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/059,353

(22) Filed: Nov. 28, 2022

(65) Prior Publication Data

US 2023/0179717 A1 Jun. 8, 2023

(30) Foreign Application Priority Data

Dec. 3, 2021 (JP) ................................ 2021-196730

(51) Int. Cl.
*G06F 15/00* (2006.01)
*H04N 1/00* (2006.01)
*H04N 1/44* (2006.01)

(52) U.S. Cl.
CPC ..... *H04N 1/00411* (2013.01); *H04N 1/00079* (2013.01); *H04N 1/00082* (2013.01); *H04N 1/00204* (2013.01); *H04N 1/00477* (2013.01); *H04N 1/4433* (2013.01); *H04N 2201/0094* (2013.01)

(58) Field of Classification Search
CPC ........... H04N 1/00411; H04N 1/00079; H04N 1/00082; H04N 1/00204; H04N 1/00477; H04N 1/4433; H04N 2201/0094

USPC ........................................................ 358/1.15
See application file for complete search history.

(56) References Cited

U.S. PATENT DOCUMENTS

| | | | |
|---|---|---|---|
| 9,826,475 B1* | 11/2017 | Mitsuhashi | H04N 1/00307 |
| 10,554,853 B2* | 2/2020 | Yoshimi | H04N 1/00474 |
| 2009/0080013 A1* | 3/2009 | Sato | H04N 1/00464 358/1.15 |
| 2017/0115936 A1* | 4/2017 | Suzuki | G06F 3/1205 |
| 2017/0344318 A1* | 11/2017 | Kawasaki | G06F 21/608 |
| 2019/0007562 A1* | 1/2019 | Sato | H04N 1/00037 |
| 2021/0306488 A1* | 9/2021 | Okuno | H04N 1/00938 |
| 2022/0141347 A1* | 5/2022 | Sumi | H04N 1/00424 358/1.15 |
| 2022/0141352 A1* | 5/2022 | Mitsui | G06F 21/6245 358/442 |

FOREIGN PATENT DOCUMENTS

JP 2013232085 A 11/2013

* cited by examiner

*Primary Examiner* — Mark R Milia
(74) *Attorney, Agent, or Firm* — Canon U.S.A., Inc. IP Division

(57) ABSTRACT

An information processing apparatus that communicates with a terminal includes a reception unit configured to receive from the terminal an execution instruction to execute a job using a function of the information processing apparatus, wherein the execution instruction at least includes setting information regarding the job, and a transmission unit configured to, in a case where the reception unit receives the execution instruction to execute the job and a predetermined screen is displayed on a display unit of the information processing apparatus, transmit information for the terminal to display the screen to the terminal having transmitted the execution instruction.

19 Claims, 19 Drawing Sheets

FIG. 6

| | FIG. 6A |
|---|---|
| | FIG. 6B |

FIG. 6A

| 601 Authentication Setting | 602 Authentication State | 603 Execution Step | 604 Process | 605 Parameter | 606 Execution Condition | 607 Automatic Transition | 608 User Operation | 609 Notification Method |
|---|---|---|---|---|---|---|---|---|
| Authentication Unnecessary | -- | 0 | Screen Check | Home Screen, Job Status Screen, Mobile Cooperation Screen | -- | Yes | -- | -- |
| | | 1 | Screen Display | Job Execution Request: Execution Target App | -- | Yes | -- | -- |
| | | 2 | Job Execution | Job Execution Request: Job Settings | -- | Yes | -- | -- |
| Authentication Necessary/Display Login Screen When Operation on Device is Started | Authenticated | 0 | Screen Check | Home Screen, Job Status Screen, Mobile Cooperation Screen | -- | Yes | -- | -- |
| | | 1 | Screen Display | Job Execution Request: Execution Target App | -- | Yes | -- | -- |
| | | 2 | Job Execution | Job Execution Request: Job Settings | -- | Yes | -- | -- |
| | Unauthenticated | 0 | Screen Check | Login Screen, Job Status Screen | -- | Yes | -- | -- |
| | | 1 | Screen Display | Login Screen | Currently Displayed Screen = Login Screen | Yes | -- | -- |
| | | 2 | Login | Job Execution Request: Login Information | -- | Yes | -- | -- |
| | | 3 | Language Switching | Setting of Logged-in User: Display Language | Current Display Language = Display Language of Logged-in User | Yes | -- | -- |

| | | # | Operation | Notice Screen | Display setting of notice screen / Display after login | Display | Close screen, Transition to initial screen, Transition to execution target app | URL content |
|---|---|---|---|---|---|---|---|---|
| 621 | UNAUTHENTICATED | 4 | SCREEN DISPLAY | NOTICE SCREEN | — | NO | — | — |
| | | 5 | SCREEN DISPLAY | SETTING OF LOGGED-IN USER: INITIAL SCREEN | (CURRENTLY DISPLAYED SCREEN = INITIAL SCREEN OF LOGGED-IN USER) AND (CURRENTLY DISPLAYED SCREEN = EXECUTION TARGET APP) | YES | — | — |
| | | 6 | SCREEN DISPLAY | JOB EXECUTION REQUEST: EXECUTION TARGET APP | CURRENTLY DISPLAYED SCREEN = EXECUTION TARGET APP | YES | — | — |
| | | 7 | SCREEN DISPLAY | SHEET SETTING SCREEN | SHEET ABSENT | NO | SHEET SETTINGS | VNC |
| | | 8 | JOB EXECUTION | JOB EXECUTION REQUEST: JOB SETTINGS | — | YES | — | — |
| 622 | AUTHENTICATED | 0 | SCREEN CHECK | HOME SCREEN, JOB STATUS SCREEN, MOBILE COOPERATION SCREEN | — | YES | — | — |
| | | 1 | SCREEN DISPLAY | JOB EXECUTION REQUEST: EXECUTION TARGET APP | — | YES | — | — |
| | | 2 | JOB EXECUTION | JOB EXECUTION REQUEST: JOB SETTINGS | — | YES | — | — |
| 623 | UNAUTHENTICATED | 0 | SCREEN CHECK | HOME SCREEN, JOB STATUS SCREEN, MOBILE COOPERATION SCREEN | — | YES | — | — |
| 624 | | 1 | SCREEN DISPLAY | LOGIN SCREEN | — | YES | — | — |
| 625 | | 2 | LOGIN | JOB EXECUTION REQUEST: LOGIN INFORMATION | — | YES | — | — |
| | | 3 | LANGUAGE SWITCHING | SETTING OF LOGGED-IN USER: DISPLAY LANGUAGE | CURRENT DISPLAY LANGUAGE = DISPLAY LANGUAGE OF LOGGED-IN USER | YES | — | — |
| | | 4 | SCREEN DISPLAY | JOB EXECUTION REQUEST: EXECUTION TARGET APP | — | YES | — | — |
| | | 5 | JOB EXECUTION | JOB EXECUTION REQUEST: JOB SETTINGS | — | YES | — | — |

Left-side row labels:
- 621/622: AUTHENTICATION NECESSARY/DISPLAY LOGIN SCREEN WHEN OPERATION ON DEVICE IS STARTED
- 623/624/625: AUTHENTICATION NECESSARY/DISPLAY LOGIN SCREEN WHEN FUNCTION THAT REQUIRES AUTHENTICATION IS SELECTED

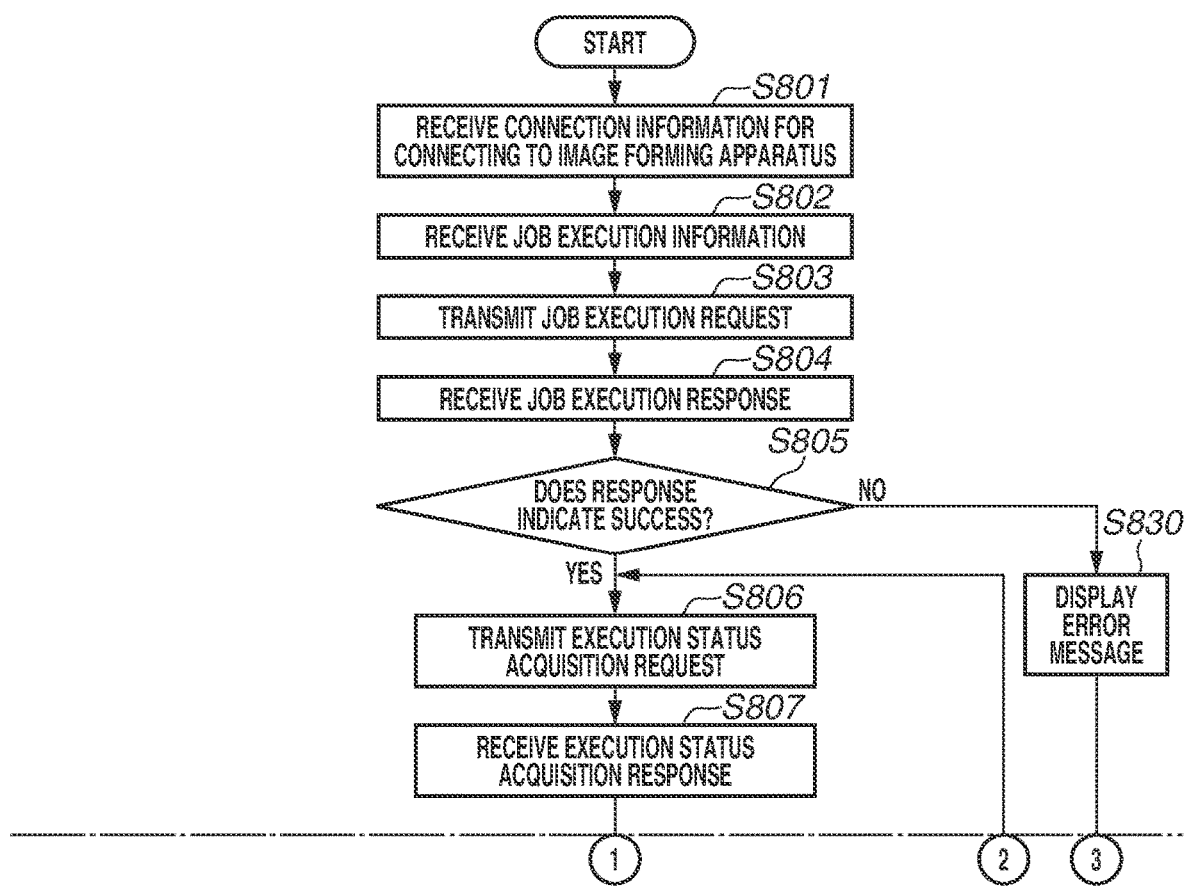

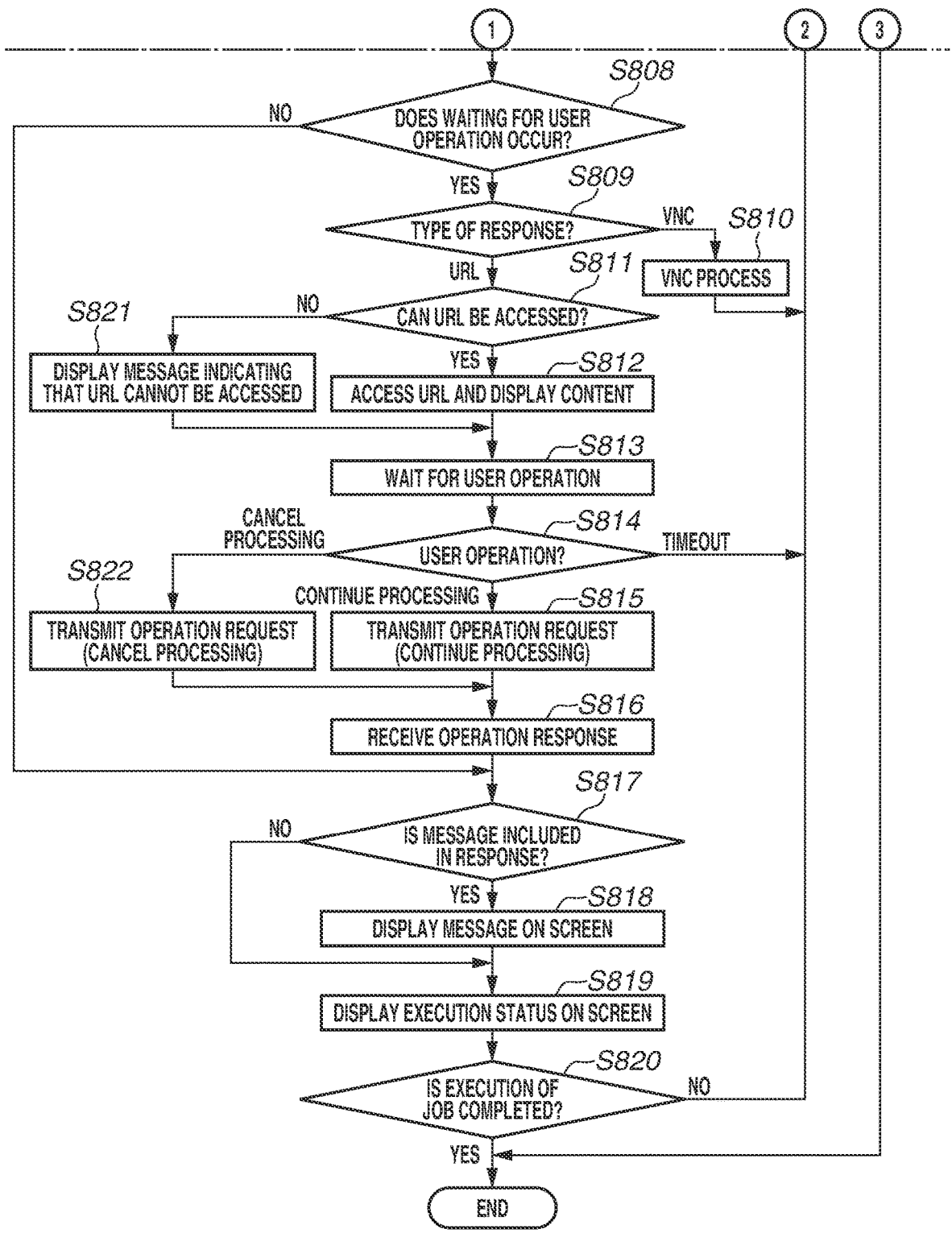

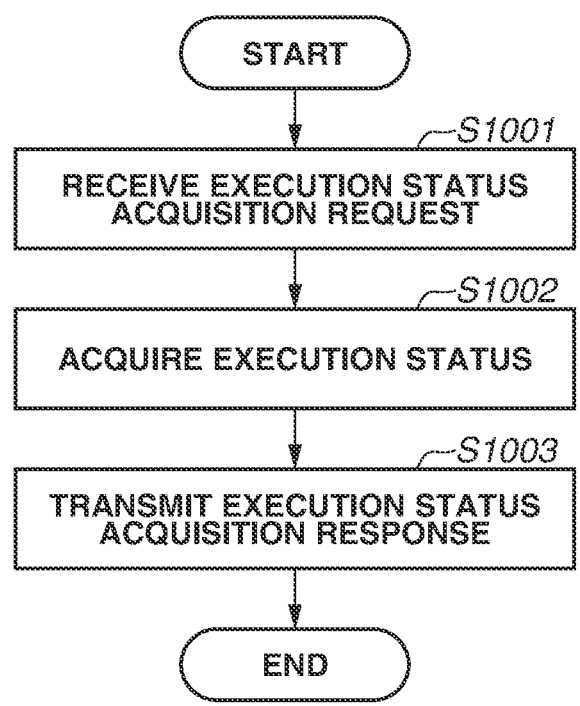

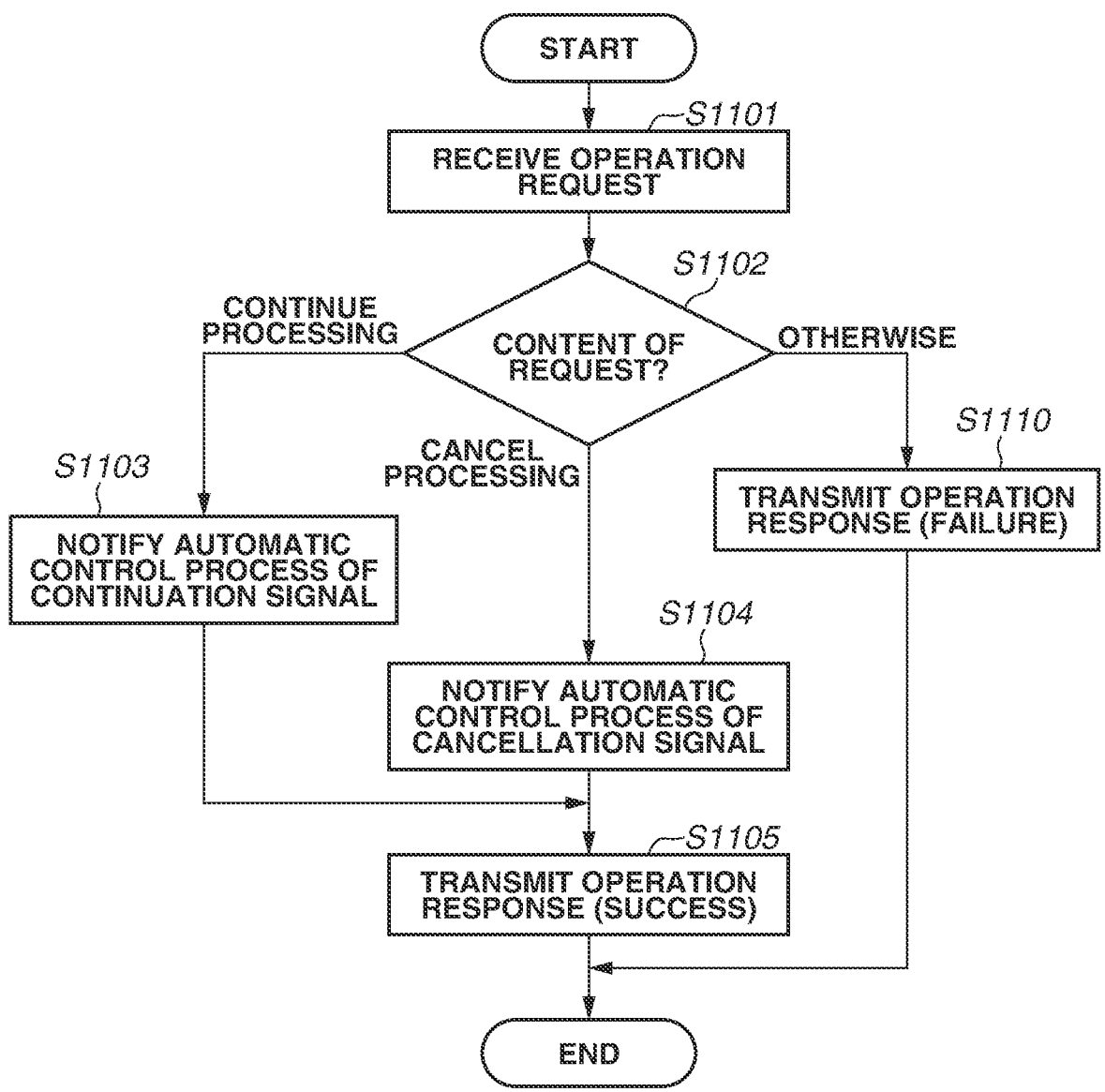

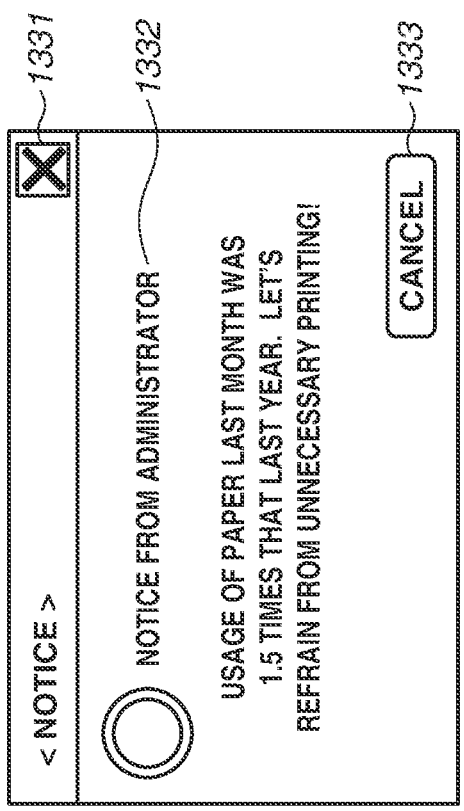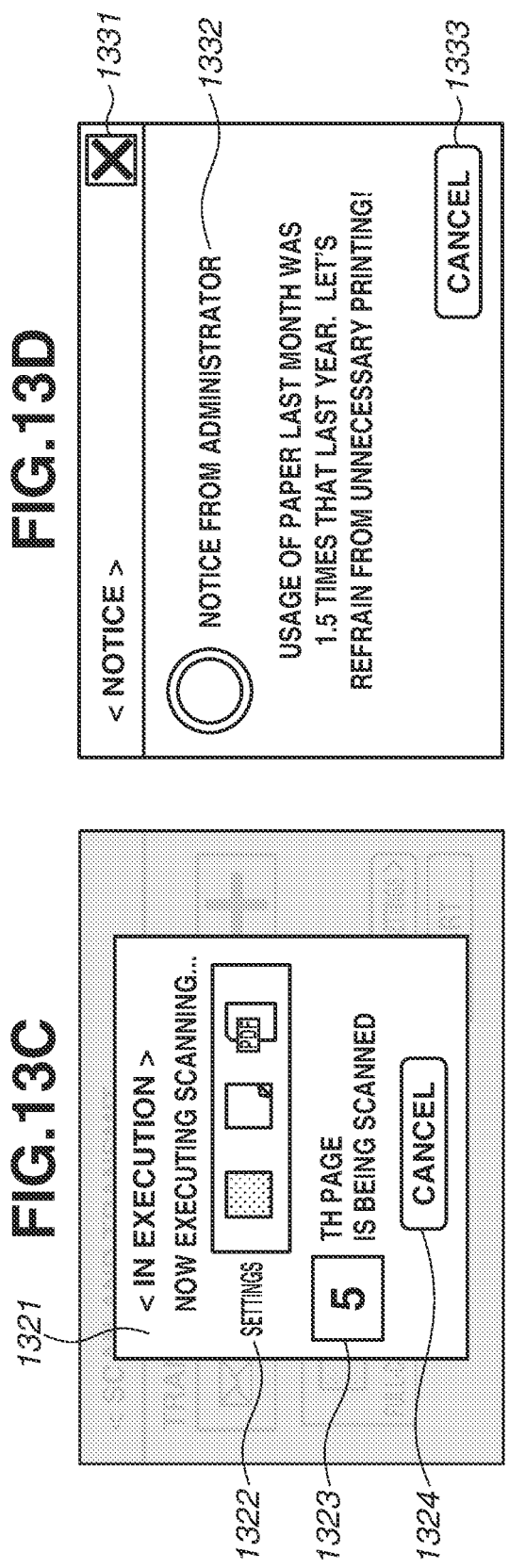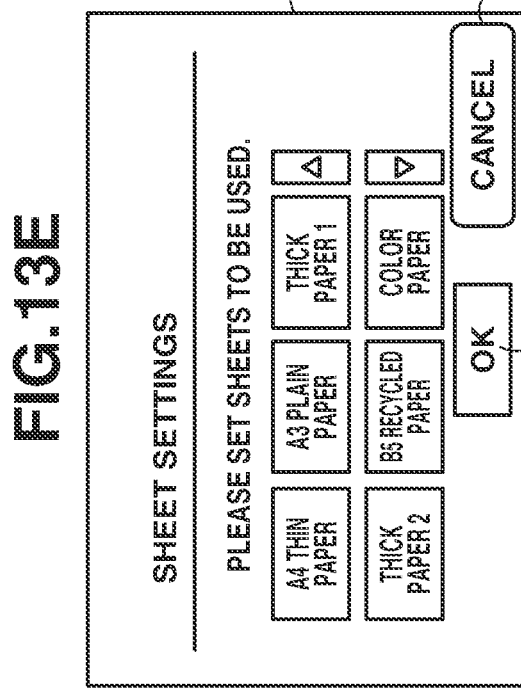

INFORMATION PROCESSING SYSTEM, INFORMATION PROCESSING APPARATUS, CONTROL METHOD EXECUTED BY THE SAME, AND STORAGE MEDIUM

BACKGROUND

Field of the Disclosure

The present disclosure relates to a data processing system where a data processing apparatus and an image forming apparatus communicate with each other to execute a job.

Description of the Related Art

In recent years, with the proliferation of high-performance mobile terminals called "smartphones", an application for using an image forming apparatus from the mobile terminal is provided. For example, in the execution of the function of transmitting a scanned document to a specified destination, the terminal searches for an image forming apparatus on a local area network (LAN) and adds the email address of a transmission destination set by a user and various pieces of scan setting information (e.g., color and two-sided), thereby generating job information. The terminal transmits the generated job information to an image forming apparatus found by the search, whereby a series of operations on the image forming apparatus necessary to execute a job can be executed from the terminal. At this time, network communication between the mobile terminal and the image forming apparatus is established in accordance with a communication protocol such as Transmission Control Protocol/Internet Protocol (TCP/IP) and can be implemented by a known technique. Japanese Patent Application Laid-Open No. 2013-232085 discusses a technique for setting a job in a client terminal such as a mobile terminal and transmitting the settings of the job from the client terminal to an image forming apparatus to cause the image forming apparatus to execute the job. In this manner, a user can cause the image forming apparatus to execute the job without operating the image forming apparatus.

However, in a case where the user causes the image forming apparatus to execute the job by operating the terminal, the user is operating the terminal and therefore may not view a notification to the user displayed on an operation panel of the image forming apparatus. For example, in a case where the image forming apparatus having received an execution instruction to execute a job automatically executes a login process, the user operating the terminal may not view a notice screen displayed to the user on the operation panel of the image forming apparatus after the login process.

SUMMARY

Embodiments of the present disclosure are directed to providing a method in which even in a case where a user gives an execution instruction to execute a job to an apparatus from a terminal, the user operating the terminal can confirm a screen displayed on the apparatus.

According to embodiments of the present disclosure, an information processing apparatus that communicates with a terminal includes a reception unit configured to receive from the terminal an execution instruction to execute a job using a function of the information processing apparatus, wherein the execution instruction at least includes setting information regarding the job, and a transmission unit configured to, in a case where the reception unit receives the execution instruction to execute the job and a predetermined screen is displayed on a display unit of the information processing apparatus, transmit information for the terminal to display the screen to the terminal having transmitted the execution instruction.

Further features of the present disclosure will become apparent from the following description of exemplary embodiments with reference to the attached drawings.

BRIEF DESCRIPTION OF THE DRAWINGS

FIG. 6 includes FIGS. 6A and 6B which collectively illustrate an example of an automatic control management table according to a first exemplary embodiment.

FIGS. 8A and 8B are a flowchart illustrating a process of the data processing apparatus according to the first exemplary embodiment.

FIG. 10 is a flowchart illustrating a process of the image forming apparatus according to the first exemplary embodiment.

FIG. 11 is a flowchart illustrating a process of the image forming apparatus according to the first exemplary embodiment.

FIGS. 13A to 13E are examples of screens displayed on the image forming apparatus.

DESCRIPTION OF THE EMBODIMENTS

With reference to the drawings, exemplary embodiments of the present disclosure will be described below. Components described in the exemplary embodiments, however, are merely illustrative, and are not intended to limit the scope of the present disclosure to them only. Although the following description is given using an image forming apparatus as an example of an information processing apparatus, the present disclosure is not limited to this.

Figure 1:
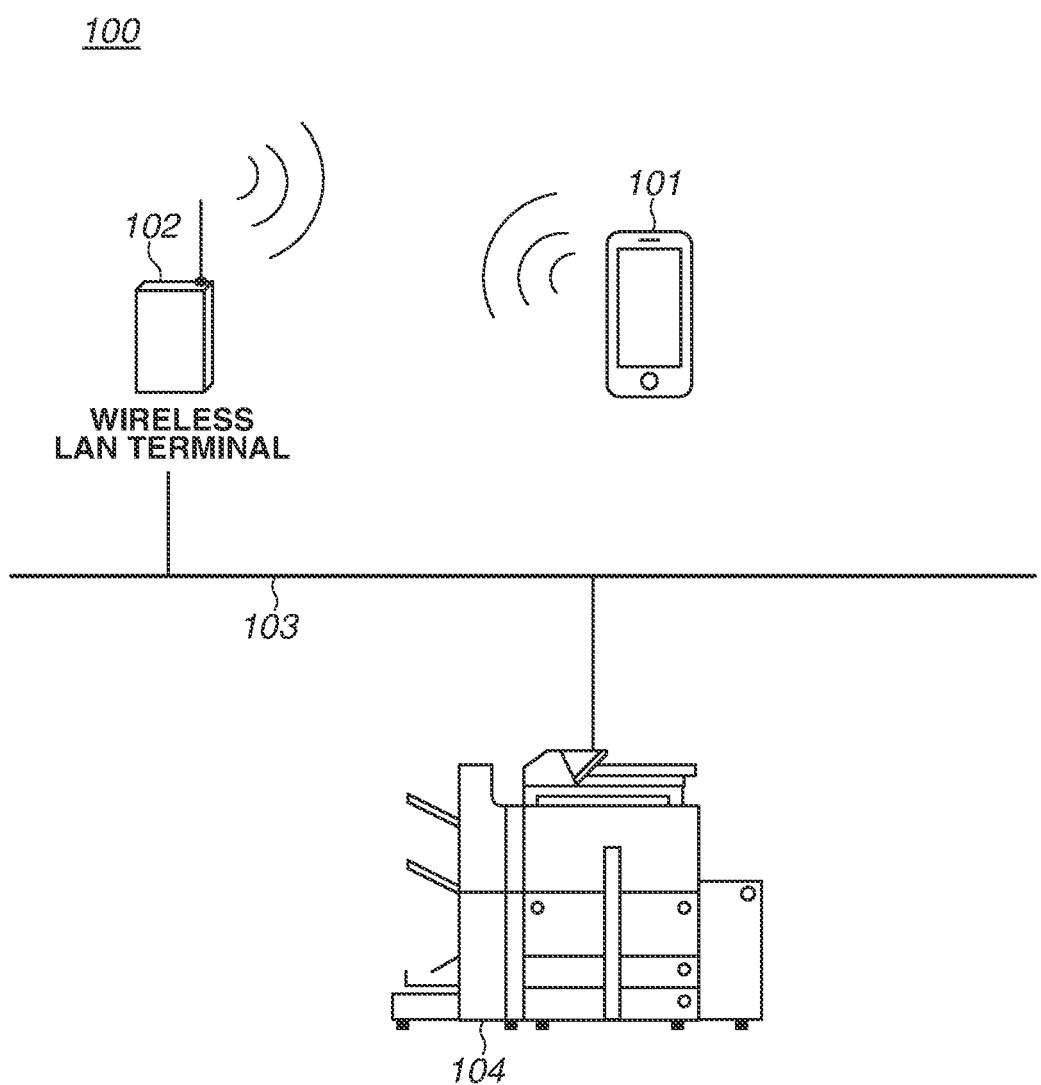
FIG. 1 is a diagram illustrating a configuration of a data processing system.

FIG. 1 is a diagram illustrating the configuration of an information processing system according to a first exemplary embodiment. A data processing system 100 includes a data processing apparatus 101, a wireless local area network (LAN) terminal 102, and an image forming apparatus 104. These apparatuses are connected to each other via a network 103 such as a LAN. To the network 103, an apparatus other than those illustrated in FIG. 1 may be connected.

The data processing apparatus 101 is a mobile terminal such as a smartphone, and may be an information processing apparatus in which an operating system for a small-sized terminal and programs for controlling a voice call, position detection, and data communication operate. Alternatively, the data processing apparatus 101 may be a personal computer (PC) that does not have the functions of voice call control and position detection control. The data processing apparatus 101 is connected to the network 103 via the wireless LAN terminal 102.

The wireless LAN terminal 102 is a wireless LAN base station having a general network/router function and provides a wireless LAN in a home or an office.

The image forming apparatus 104 is a multifunction peripheral having various functions such as a printer function, a copy function, a scanner function, and a fax transmission function. The image forming apparatus 104, however, is not limited to this, and may be an apparatus having only a single function. The image forming apparatus 104 may include a wireless access point inside and may be configured to directly communicate with the data processing apparatus 101. Using the data processing apparatus 101 communicating with the image forming apparatus 104, a user can instruct the image forming apparatus 104 to execute a job and can execute various functions of the image forming apparatus 104. In the present exemplary embodiment, a form is employed in which the image forming apparatus 104 is connected to the network 103 in a wired manner. Alternatively, similarly to the data processing apparatus 101, the image forming apparatus 104 may be wirelessly connected to the network 103 using the wireless LAN terminal 102.

Further, the data processing apparatus 101 and the image forming apparatus 104 can perform short-range wireless communication using near-field communication (NFC) or Bluetooth®. The image forming apparatus 104 transmits connection information (an Internet Protocol (IP) address, a media access control (MAC) address, or a Service Set Identifier (SSID)) for establishing a wireless LAN connection with the image forming apparatus 104 via NFC communication units or Bluetooth Low Energy (BLE) communication units (described below) to the data processing apparatus 101. Then, the data processing apparatus 101 starts wireless LAN communication with the image forming apparatus 104 using the acquired connection information.

Figure 2:
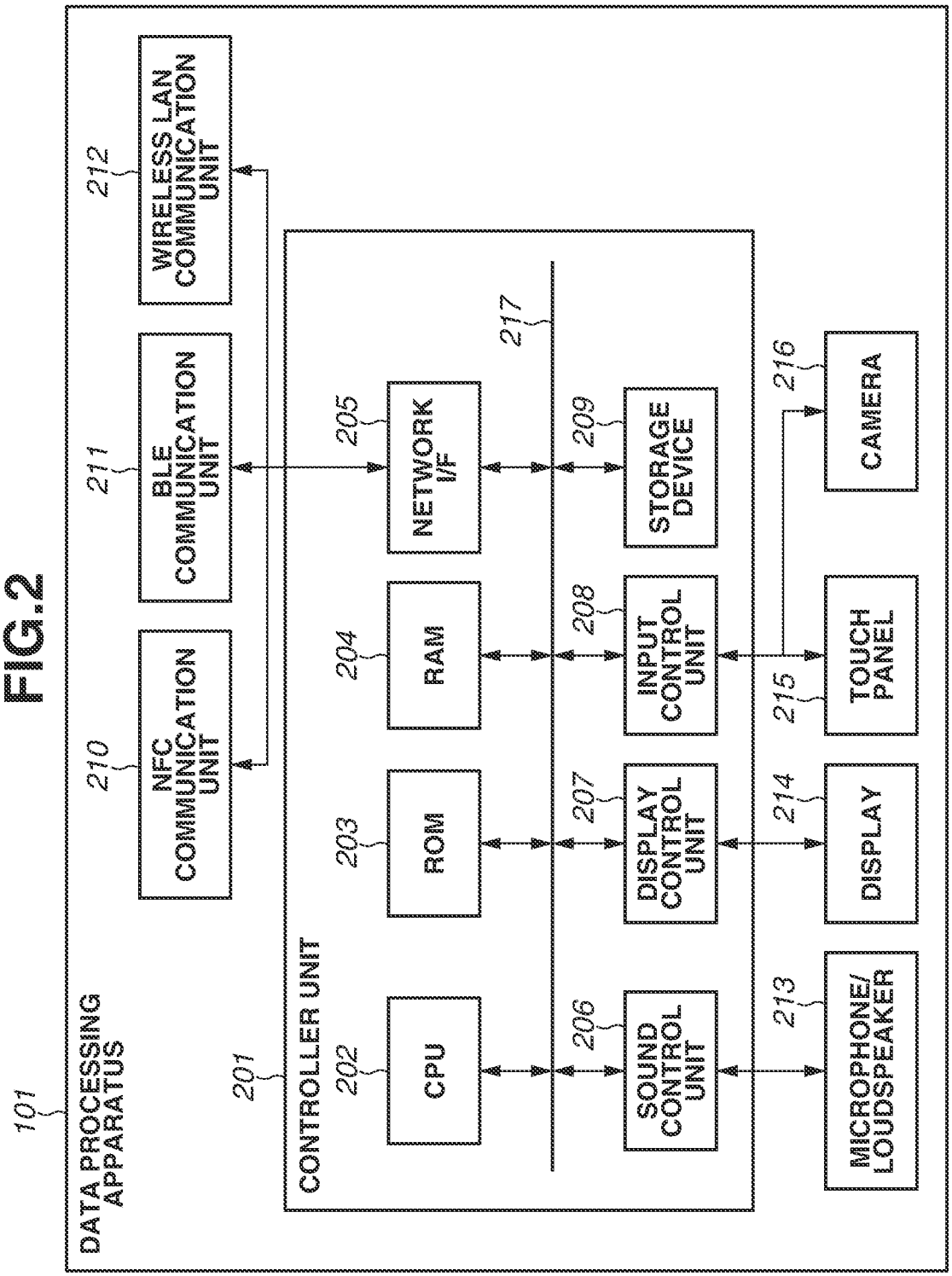
FIG. 2 is a block diagram illustrating a hardware configuration of a data processing apparatus.

FIG. 2 is a hardware configuration diagram of the data processing apparatus 101 according to the present exemplary embodiment. The data processing apparatus 101 includes a controller unit 201. The controller unit 201 controls various communication units such as an NFC communication unit 210, a BLE communication unit 211, and a wireless LAN communication unit 212, and various user interface (UI) units such as a microphone/loudspeaker 213, a display 214, a touch panel 215, and a camera 216.

The controller unit 201 includes a central processing unit (CPU) 202, a read-only memory (ROM) 203, a random-access memory (RAM) 204, a network interface (I/F) 205, a sound control unit 206, a display control unit 207, an input control unit 208, and a storage device 209. These components are connected to each other by a system bus 217.

The CPU 202 controls the entirety of the system of the data processing apparatus 101. The ROM 203 stores an operating system of the data processing apparatus 101 and programs for controlling a telephone call and data communication. The CPU 202 executes various programs. The RAM 204 is used as a temporary storage area such as a main memory or a work area for the CPU 202.

The storage device 209 is a non-volatile storage device and records various operation mode settings that need to be held even after the restart of the data processing apparatus 101, and an operation log.

The network I/F 205 is connected to the NFC communication unit 210, the BLE communication unit 211, and the wireless LAN communication unit 212 and exchanges data with the image forming apparatus 104 through various types of wireless communication.

The sound control unit 206 controls the input and output of sound data via the microphone/loudspeaker 213. The display control unit 207 controls the output of a screen to be displayed on a display unit such as the display 214. The input control unit 208 controls the input of information designated by the user using a hardware key or the touch panel 215. Various applications executed by the data processing apparatus 101 use the sound control unit 206, the display control unit 207, and the input control unit 208.

Figure 3:
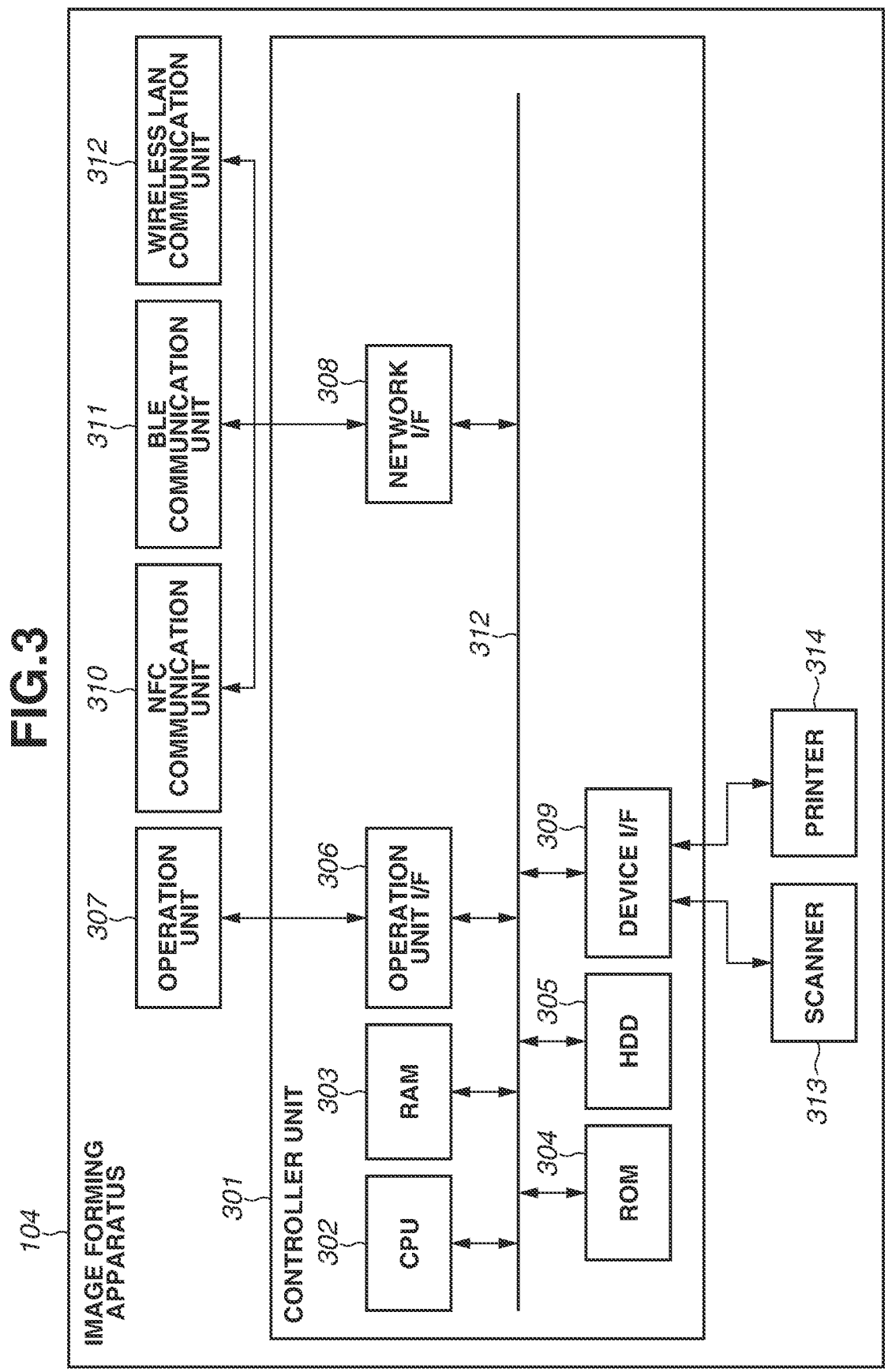
FIG. 3 is a block diagram illustrating a hardware configuration of an image forming apparatus.

FIG. 3 is a hardware configuration diagram of the image forming apparatus 104 according to the present exemplary embodiment. The image forming apparatus 104 includes a controller unit 301. The controller unit 301 controls various communication units such as an NFC communication unit 310, a BLE communication unit 311, and a wireless LAN communication unit 312, an operation unit 307, a scanner 313 that executes a scan function, and a printer 314 that executes a print function. In a case where the user uses a copy function of the image forming apparatus 104, the controller unit 301 controls the scanner 313 to acquire image data on a document and controls the printer 314 to print the image on a sheet and output the sheet. In a case where the user uses a "scan and transmit" function, the controller unit 301 controls the scanner 313 to acquire image data on a document and convert the image data into code data. Then, the controller unit 301 transmits the code data to the data processing apparatus 101 via a network I/F 308. In a case where the user uses the print function, the controller unit 301 receives image data (code data) from the data processing apparatus 101 via the network I/F 308. Then, the controller unit 301 transmits the received image data to the printer 314. Based on the received image data, the printer 314 prints the image on a sheet and outputs the sheet. The image forming apparatus 104 also has a fax reception function for receiving data from an Integrated Services Digital Network (ISDN) line and printing the data, and a fax transmission function for transmitting scanned data to the ISDN line. A task as a processing target for which settings are made by the user to execute each function as illustrated above is referred to as a "job". The image forming apparatus 104 executes a job in accordance with job information. For example, in the case of a "scan and transmit" job, the image forming apparatus 104 performs scanning based on scan settings included in job information and transmits image data generated by the scanning to a destination included in the job information.

The controller unit 301 includes a CPU 302, a RAM 303, a ROM 304, a hard disk drive (HDD) 305, an operation unit I/F 306, the network I/F 308, and a device I/F 309. These components are connected to each other by a system bus 312.

The CPU 302 controls the entirety of the system of the image forming apparatus 104. The RAM 303 is a system work memory for the operation of the CPU 302 and temporarily stores image data.

The RAM 303 also stores scan image data read by the scanner 313 and stores print image data received from the data processing apparatus 101 via the network 103.

The ROM 304 stores a boot program for the system and an application. The HDD 305 stores an operating system, system software, application software, image data, and setting data.

The operation unit 307 displays information to the user and receives an operation from the user.

The operation unit 307 includes an operation panel such as a touch panel display, and a hardware key.

The operation unit I/F 306 outputs information to be displayed on the operation unit 307 to the operation unit 307.

The operation unit I/F 306 also receives information input by the user from the operation unit 307. The network I/F 308 is connected to the NFC communication unit 310, the BLE communication unit 311, and the wireless LAN communication unit 312 and exchanges information with the data processing apparatus 101 through various types of communication. The wireless LAN communication unit 312 performs wireless LAN communication with the data processing apparatus 101 via the network 103. The NFC communication unit 310 and the BLE communication unit 311 perform short-range wireless communication with the data processing apparatus 101. The image forming apparatus 104 receives job setting information, image data, and a job execution command from the data processing apparatus 101 via the network I/F 308 and executes a job. The device I/F 309 connects the scanner 313 and the printer 314 that read and print image data to the controller unit 301, and inputs and outputs image data.

Figure 4:
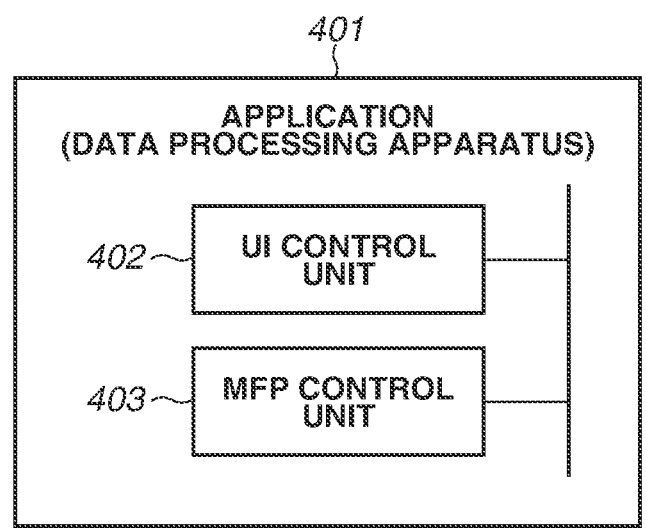
FIG. 4 is a block diagram illustrating a software configuration of the data processing apparatus.

FIG. 4 is a block diagram illustrating the software configuration of the data processing apparatus 101 according to the present exemplary embodiment. FIG. 4 is a functional block diagram of software implemented by the CPU 202 reading a control program stored in the ROM 203 or the storage device 209.

An application 401 is an application installed on the data processing apparatus 101 and used to cause the image forming apparatus 104 to operate. The application 401 communicates with the image forming apparatus 104 and transmits various requests to the image forming apparatus 104 or receives various responses from the image forming apparatus 104, thereby cooperating with the image forming apparatus 104. For example, print job information or scan job information can be generated by making settings on the application 401, and the generated job information can be transmitted to the image forming apparatus 104. Various other applications are installed on the data processing apparatus 101 in addition to the application 401, but are not described. The configuration of the application 401 is described below.

A UI control unit 402 receives job setting information input by the user using the touch panel 215 and connection information for connecting to the image forming apparatus 104 and provides the job setting information and the connection information to a multifunction peripheral (MFP) control unit 403. The UI control unit 402 acquires a response from the MFP control unit 403 and outputs the response to the display 214 via the display control unit 207. Further, the UI control unit 402 controls an auto clearing function as a part of user interface control. "Auto clearing" is the process of, in a case where the data processing apparatus 101 does not receive an operation from the user for a predetermined time, clearing all setting values set on a display screen or displaying an initial screen set in advance. The "initial screen" can be set in advance by the user. If the user is logged into the data processing apparatus 101 when a function screen is displayed or auto clearing occurs, the UI control unit 402 automatically performs a logout process. Further, the UI control unit 402 also has a function as a web browser that displays a web content screen. That is, the UI control unit 402 can also acquire web content using a Uniform Resource Locator (URL) and display the web content. Further, the UI control unit 402 can also operate as a Virtual Network Computing (VNC) client.

The MFP control unit 403 establishes communication with the image forming apparatus 104 and sends a request to the image forming apparatus 104 or receives a response from the image forming apparatus 104. The MFP control unit 403 generates job information from job settings and authentication information received by the UI control unit 402 and transmits the job information to the image forming apparatus 104 via the network 103. The MFP control unit 403 also acquires the execution status of a job from the image forming apparatus 104 via the network 103 and transmits the execution status of the job to the UI control unit 402.

Figure 5:
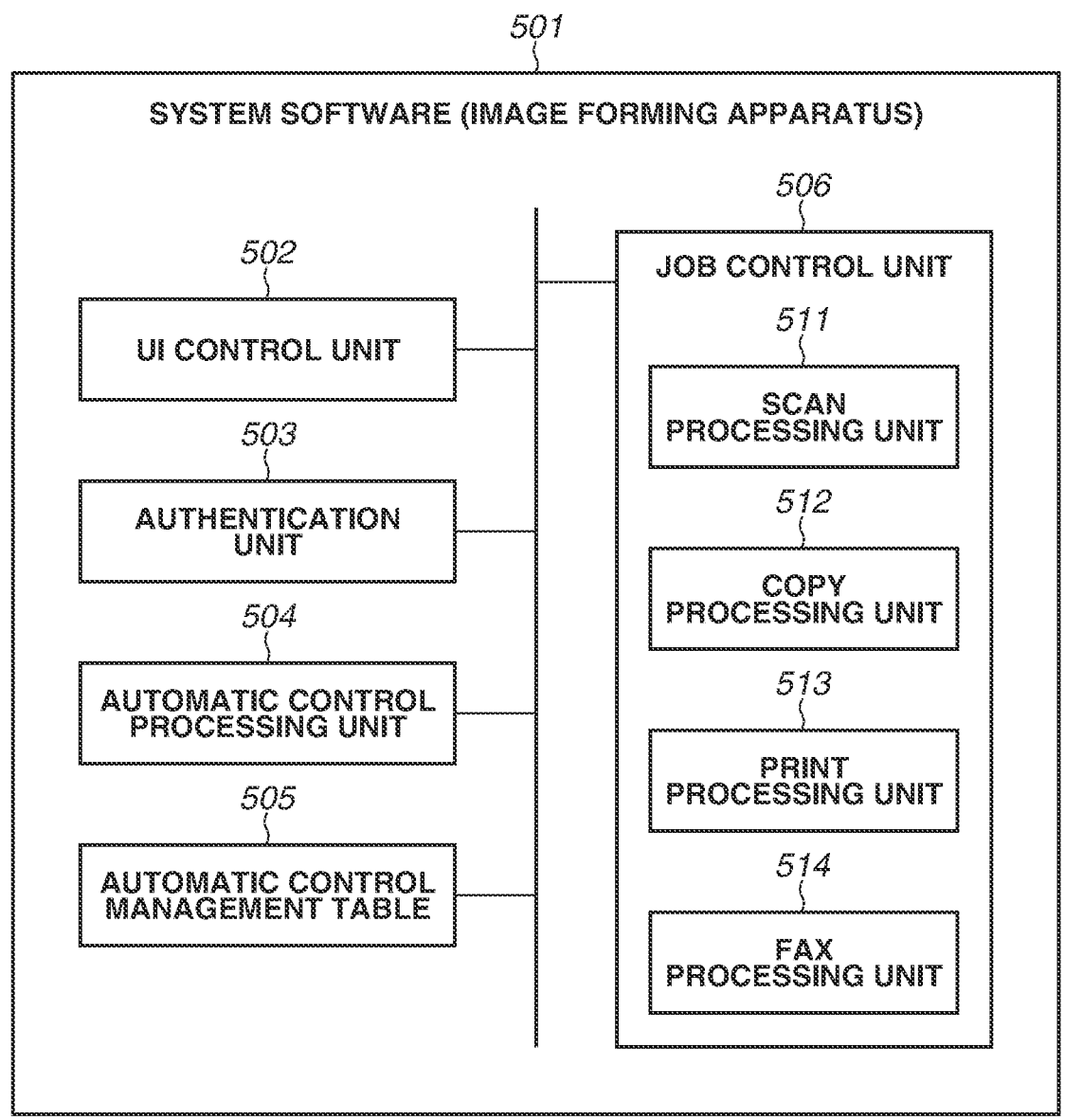
FIG. 5 is a block diagram illustrating a software configuration of the image forming apparatus.

FIG. 5 is a block diagram illustrating the software configuration of the image forming apparatus 104 according to the present exemplary embodiment.

System software 501 is software executed by the CPU 302 of the image forming apparatus 104 and is stored in the RAM 303.

A UI control unit 502 receives information input via the operation unit 307 by the user and controls a screen. The UI control unit 502 also has a function as a web browser that displays web content. For example, the UI control unit 502 can acquire web content as a notice screen through which the user is given notice from an external server or the inside of the image forming apparatus 104, and display the web content.

An authentication control unit 503 manages authentication information about the user, an authentication setting, and an authentication state. For example, the authentication control unit 503 performs a user authentication process based on authentication information received from the data processing apparatus 101 and returns the result of the user authentication process to the data processing apparatus 101.

An automatic control processing unit 504 performs automatic control of the image forming apparatus 104 based on a request received from the data processing apparatus 101. The "automatic control" refers to the process of successively executing a series of processes that is defined in advance by combining a plurality of processes.

An automatic control management table 505 is a table that manages information necessary for the automatic control processing unit 504 to perform the automatic control of the image forming apparatus 104.

A job control unit 506 controls processing units such as a scan processing unit 511, a copy processing unit 512, a print processing unit 513, and a fax processing unit 514 in accordance with job settings to execute various jobs. Although not illustrated, the image forming apparatus 104 can also function as a VNC server.

FIGS. 6A and 6B collectively illustrate an example of the automatic control management table 505 according to the present exemplary embodiment. The automatic control management table 505 defines processes of the automatic control performed by the image forming apparatus 104 in each condition that is determined based on a combination of the authentication setting and the authentication state of the image forming apparatus 104. The automatic control includes a plurality of steps, and a single row of the table defines a process performed in a single step. If the image forming apparatus 104 receives job information as a job execution request from the data processing apparatus 101, the processes of steps are started.

An "authentication setting" column 601 is a column indicating the authentication setting of the image forming apparatus 104. The authentication setting is set by the administrator of the image forming apparatus 104. The authentication setting includes an "authentication unnecessary" setting that does not require user authentication to operate the image forming apparatus 104, and an "authentication necessary" setting that requires authentication to operate the image forming apparatus 104. The "authentication necessary" setting includes "authentication necessary/display login screen when operation on device is started", which is a setting for requesting authentication in a case where the user starts operating the image forming apparatus 104, and "authentication necessary/display login screen when function that requires authentication is selected", which is a setting for requesting authentication only in a case where the user uses a predetermined function.

An "authentication state" column 602 is a column indicating the authentication state of the image forming apparatus 104. The authentication state includes an authenticated state and an unauthenticated state. The automatic control to be performed is determined based on the combination of the "authentication setting" column 601 and the "authentication state" column 602.

An "execution step" column 603 defines the processing order of the automatic control. The processes are performed in ascending order of numbers. Execution step 0 is a special step and defines the process of checking to determine whether the automatic control can be started. If it is determined in execution step 0 that the automatic control can be started, the subsequent execution steps are performed. If not, the subsequent execution steps are not performed.

A "process" column 604 defines a process to be performed in each execution step. A "parameter" column 605 defines a parameter to be assigned when the process defined in the "process" column 604 is performed.

An "execution condition" column 606 defines a condition for performing each execution step. A step in which the execution condition is "-" is always performed. In an execution step in which a specific condition is defined as the execution condition, only if the condition is satisfied, the execution step is performed. If the condition is not satisfied, the execution step is not performed, and the automatic control proceeds to the next execution step.

An "automatic transition" column 607 defines whether to automatically proceed to the next execution step without an operation of the user. In an execution step in which the automatic transition is "YES", if the defined process is performed, the process of the next execution step is automatically performed. In an execution step in which the automatic transition is "NO", after the defined process is performed, an operation of the user is waited for. A "user operation" column 608 defines a user operation that can be received after an execution step in which the automatic transition is "NO" is performed.

After an execution step in which the automatic transition is "NO" is performed, the next execution step is performed upon receipt of the operation defined in the "user operation" column 608.

A "notification method" column 609 is a column describing a method for causing the data processing apparatus 101 to display a screen displayed on the image forming apparatus 104 in a case where an execution step is performed. This column is used in a determination in step S910 (described below). If the "notification method" column 609 indicates "URL", a URL for accessing the web content currently displayed on the image forming apparatus 104 is transmitted to the data processing apparatus 101.

If the "notification method" column 609 indicates "VNC", the data processing apparatus 101 displays the same screen as a screen currently displayed on the image forming apparatus 104, using VNC.

An example of the automatic control is described. For example, in a case where the authentication setting is "authentication necessary/display login screen when operation on device is started" and the authentication state is "unauthenticated", upon receipt of an execution instruction to execute a job from the data processing apparatus 101, the processes of rows 617 to 625 are executed. If the automatic control can be started, then in execution step 1, a login screen for receiving the input of authentication information is displayed. Next, in execution step 2, a login process is performed using authentication information included in job information. In execution step 3, a display language is switched. If a setting is made such that the image forming apparatus 104 displays the notice screen after login, then in execution step 4, the notice screen is displayed. If the notice screen is displayed, the automatic control does not automatically transition to the next step. If the image forming apparatus 104 or the data processing apparatus 101 receives a user operation, the automatic control proceeds to the next execution step. In execution step 5, an initial screen set by the logged-in user is displayed. Then, in execution step 6, a setting screen for the job for which the execution instruction is given, i.e., a screen of an application, is displayed. Then, the image forming apparatus 104 executes the job based on job settings included in the execution instruction to execute the job. At this time, if a sheet absence error is detected, a sheet setting screen is displayed. Then, if a setting is received, the job is executed. As described above, if the image forming apparatus 104 receives job information from the data processing apparatus 101, the image forming apparatus 104 causes screens to sequentially automatically transition and executes a job.

Figure 7:
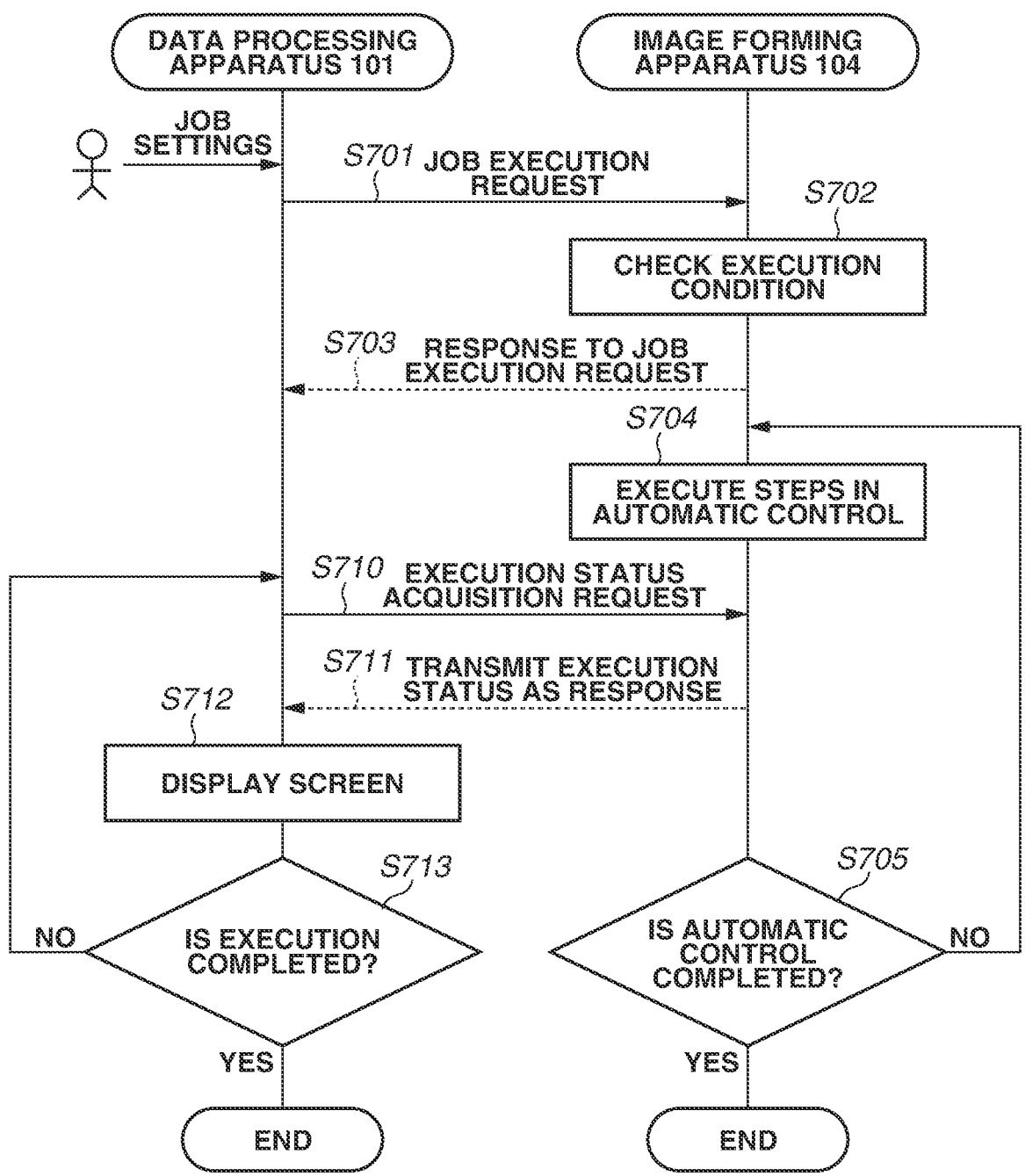
FIG. 7 is a sequence diagram illustrating a flow of processing in an entirety of the data processing system according to the first exemplary embodiment.

FIG. 7 is a sequence diagram illustrating the exchange of requests and responses between the data processing apparatus 101 and the image forming apparatus 104 according to the present exemplary embodiment.

In step S701, the data processing apparatus 101 transmits job information including the setting values of a job input by the user, as a job execution request to the image forming apparatus 104.

In step S702, the image forming apparatus 104 checks whether the job corresponding to the job information received by the data processing apparatus 101 can be executed. In step S703, the image forming apparatus 104 transmits the result of the check as a response to the job information to the data processing apparatus 101.

In step S704, the image forming apparatus 104 references the automatic control management table 505 illustrated in FIGS. 6A and 6B and executes the processes of the execution steps in the automatic control. In step S705, the image forming apparatus 104 determines whether the execution of the automatic control are is completed up to the last step. If the execution of the automatic control is completed up to the last step (YES in step S705), the processing ends. If not (NO in step S705), the processing returns to step S704. In step S704, the image forming apparatus 104 executes the process of the next execution step.

Next, the processes of steps S710 to S713 are described. The processes of step S710 and the subsequent steps are processes for displaying a screen indicating the status of the image forming apparatus 104 or a notice screen on the data processing apparatus 101, and the data processing apparatus 101 inquires of the image forming apparatus 104 at regular intervals. The process of displaying the execution status on the data processing apparatus 101 (the processes of steps S710 to S713) and the automatic control process in the image forming apparatus 104 (the processes of steps S704 and S705) are performed asynchronously.

In step S710, the data processing apparatus 101 transmits an execution status acquisition request to inquire of the image forming apparatus 104 about the execution status. In step S711, the image forming apparatus 104 acquires the execution status and transmits the execution status to the data processing apparatus 101. In step S712, based on the response received from the image forming apparatus 104, the data processing apparatus 101 displays a screen on the display 214. In step S713, if the execution status received from the image forming apparatus 104 indicates that the execution is completed (YES in step S713), the processing ends. If not (NO in step S713), the processing returns to step S710.

FIGS. 13A to 13E are examples of screens displayed on the operation unit 307 of the image forming apparatus 104 in a case where the user causes the image forming apparatus 104 to execute a job.

Figure 13B:
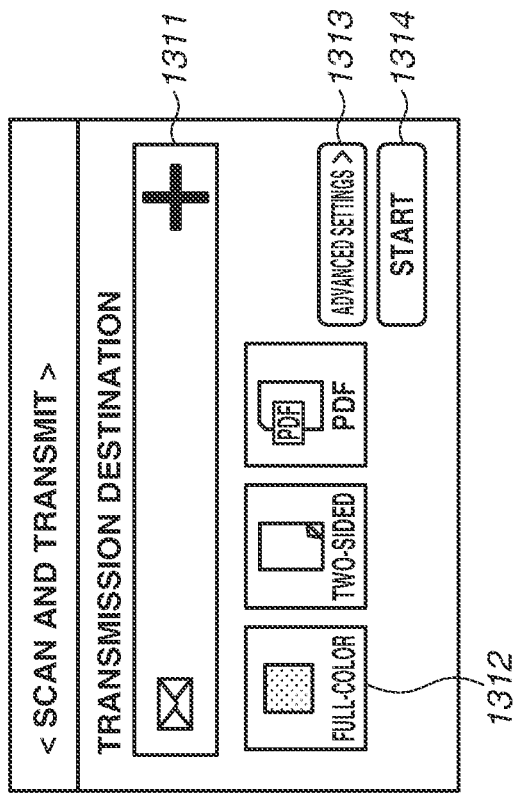
Figure 13A:
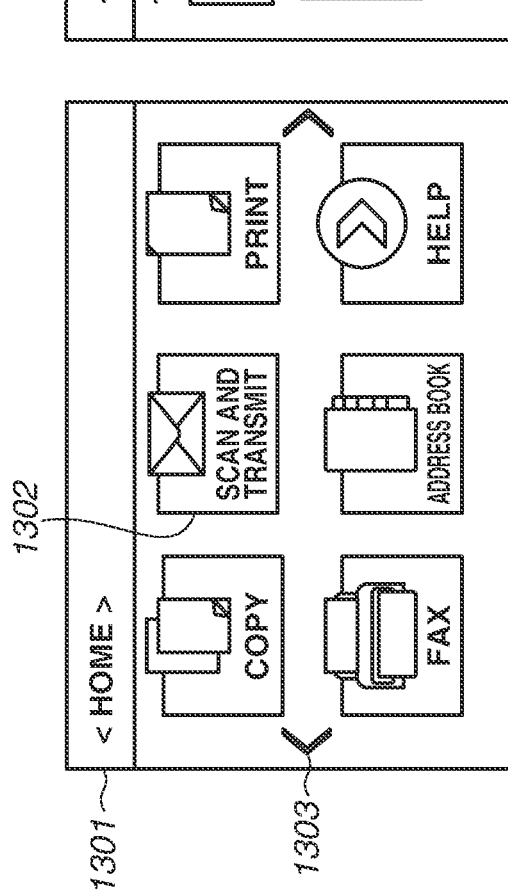

FIG. 13A is an example of an initial screen that is a home screen and is displayed if the user succeeds in authentication and logs into the image forming apparatus 104. On the home screen, buttons corresponding to applications that can be executed by the image forming apparatus 104 are arranged. The home screen has the function of, if it is detected that the user selects any of the buttons, calling the selected application.

An area 1301 indicates the name of the currently displayed screen. A button 1302 is used to call an application. As an example, the button 1302 indicates a button for calling a "scan and transmit" application. An icon 1303 is used to advance the page. The initial screen to be displayed if the user logs into the image forming apparatus 104 is not limited to the home screen, and may be a screen of each application.

FIG. 13B is an example of a screen of an application for executing a job. As an example, FIG. 13B illustrates a screen of the "scan and transmit" application which is displayed after the button 1302 is pressed.

An area 1311 is used to set a destination to which an electronic mail is to be transmitted. A button 1312 is used to set the setting value of scanning. A button 1313 is used to call setting items that cannot be included in the screen. A button 1314 is used to receive the start of the job from the user.

FIG. 13C is an example of a screen during the execution of the job. This screen is displayed if the button 1314 is pressed on the screen in FIG. 13B. FIG. 13C illustrates a pop-up 1321 that is displayed on the screen illustrated in FIG. 13B, and the pop-up 1321 indicates the execution status of the job. An area 1322 displays the setting values of the currently executed job. An area 1323 indicates the progress status of the job. A button 1324 is used to receive the cancellation of the job from the user.

FIG. 13D is an example of a notice screen. The "notice screen" is a screen for the administrator to display content of which the user is be notified when using the image forming apparatus 104. Although the description is given on the assumption that the notice screen is web content included in the image forming apparatus 104 or an external server, the notice screen may not be web content. The timing when the notice screen is displayed is determined based on the setting. For example, the notice screen can be set to be displayed immediately after the user logs into the image forming apparatus 104 (before the initial screen is displayed) or immediately after the user logs out of the image forming apparatus 104. A configuration may be employed in which every time the notice screen is displayed, the web content is acquired from the external server, or a configuration may be employed in which the web content acquired from the server is saved in advance in the image forming apparatus 104 and displayed. A button 1331 is used to close the notice screen. If the button 1331 is pressed, the automatic control proceeds to the next process (e.g., the display of the initial screen). An area 1332 displays an image and a message. A cancel button 1333 is a button for cancelling the next process. For example, in a case where the notice screen is displayed after login, upon pressing of the cancel button 1333, the initial screen is not displayed, and the notice screen returns to the screen before login.

FIG. 13E is a display screen of operation assistance information. The "operation assistance information" is information for notifying the user of an operation to be performed by the user so that the image forming apparatus 104 continues the execution of the job. For example, FIG. 13E illustrates a setting screen 1341 for, in a case where set sheets run out during the execution of a copy job, newly selecting sheets to be used. A pop-up dialog may be displayed on the screen currently displayed on the operation unit 307 to present operating instructions, or operation information may be displayed in a blank portion of the screen so that an operation of the user is not hindered. If the execution of the job is to be continued, the user selects the setting of sheets to be used and presses an OK button 1342. If the processing is not to be continued, the user presses a cancel button 1343. A user operation for continuing the execution of the job is defined in the "user operation" column 608 in the automatic control management table 505. Based on this definition, the UI control unit 502 determines content to be displayed as the operation assistance information.

FIGS. 12A to 12G are examples of screens displayed by the application 401 of the data processing apparatus 101.

Figure 12A:
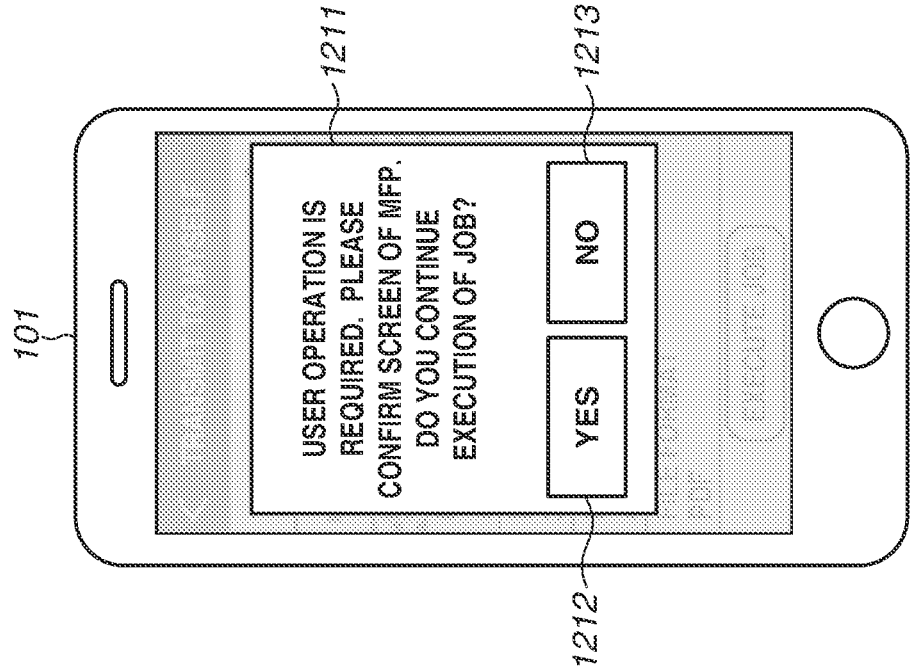
FIGS. 12A to 12G are examples of screens of the data processing apparatus according to the first exemplary embodiment.
Figure 12B:
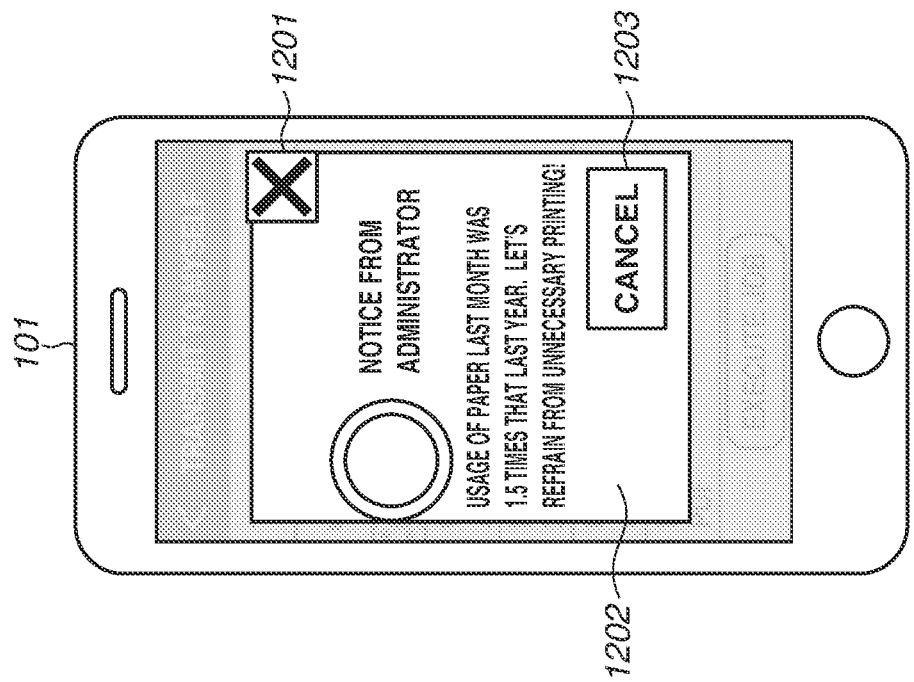
Figure 12C:
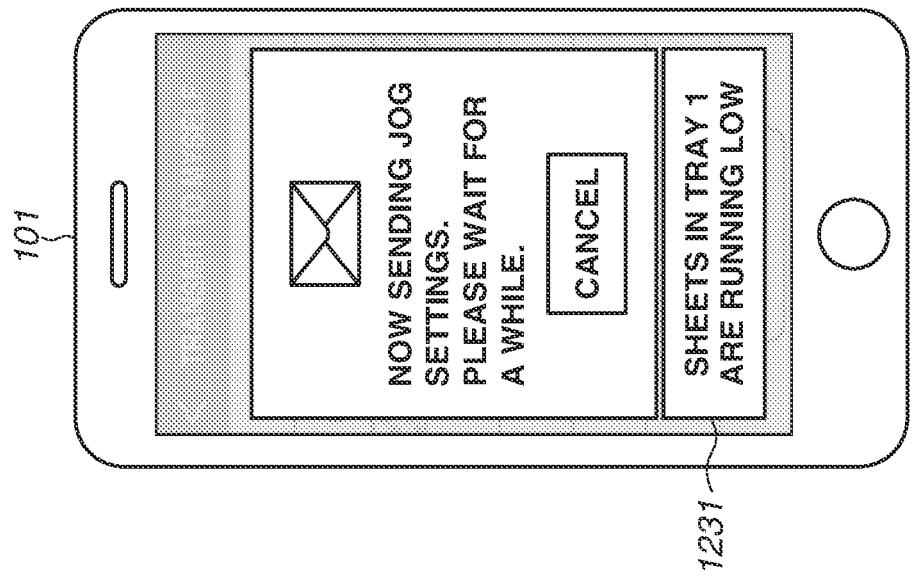
Figure 12D:
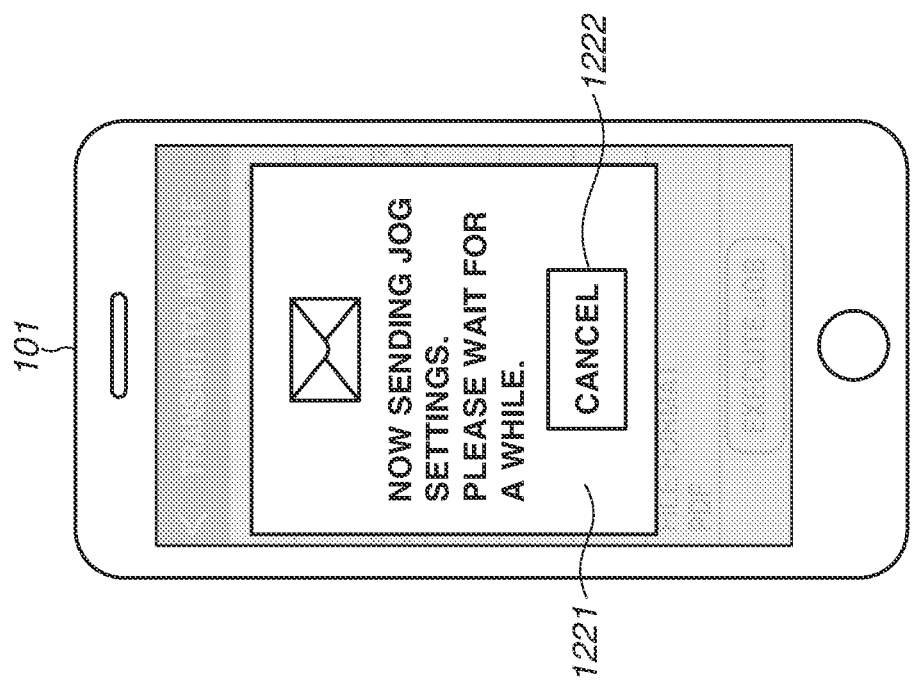
Figure 12F:
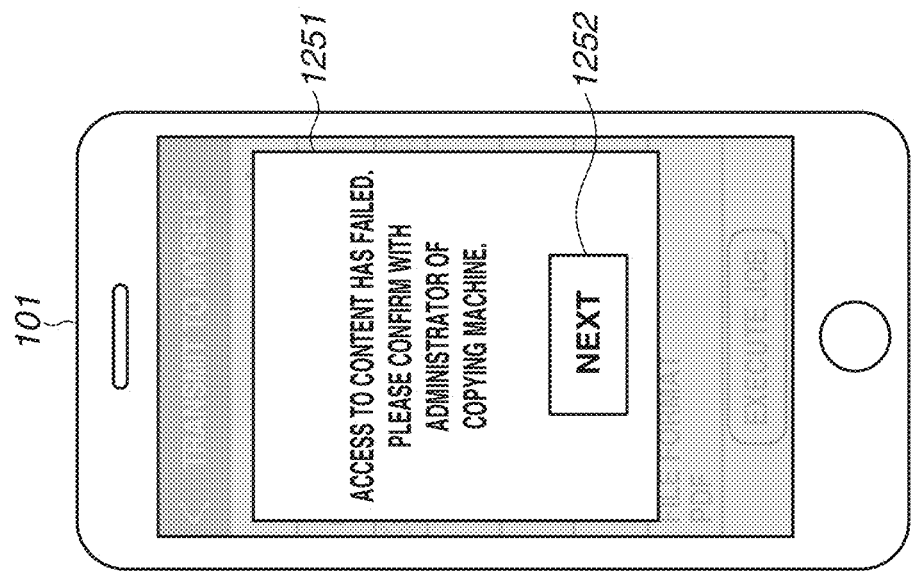
Figure 12E:
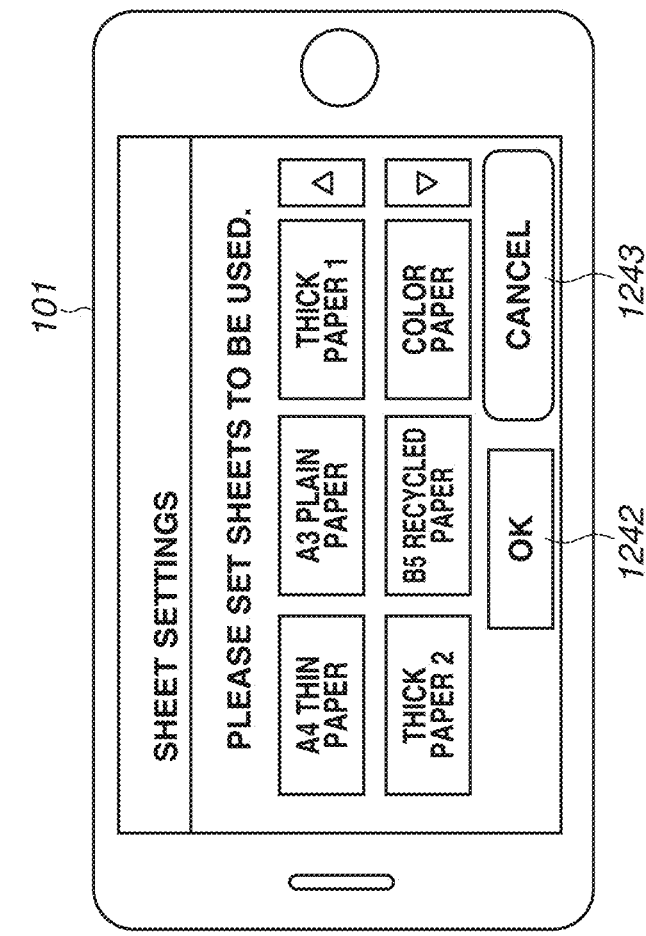
Figure 12G:
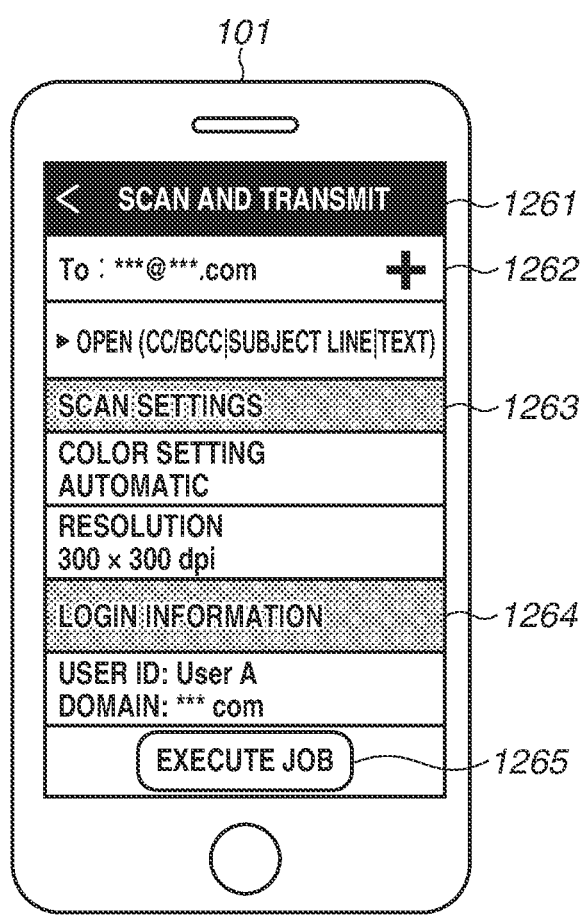

FIG. 12G illustrates a screen for inputting the settings of job information to be transmitted to the image forming apparatus 104. An area 1261 indicates an application to be executed. As an example, a "scan and transmit" application is displayed. An area 1262 is an area to which a transmission destination is input.

An area 1263 is an area where the setting values of scanning are set. An area 1264 is an area to which authentication information for logging into the image forming apparatus 104 is input. If the user presses an "execute job" button 1265, the job information is transmitted from the data processing apparatus 101 to the image forming apparatus 104. The job information includes the job setting information input to the areas 1262 and 1263 and the authentication information input to the area 1264. The image forming apparatus 104 having received the job information executes a login process using the authentication information included in the job information and then executes a job.

FIG. 12A is an example of a notice screen. The notice screen is a screen displayed by acquiring web content using a URL acquired from the image forming apparatus 104. The same screen as the notice screen displayed on the image forming apparatus 104 (FIG. 13D) is displayed. The timing when the notice screen is displayed may be the same as or different from the timing when the notice screen is displayed on the image forming apparatus 104. For example, if the notice screen is set to be displayed after the user logs into the image forming apparatus 104, the notice screen is displayed by the application 401 after the job information is transmitted from the data processing apparatus 101 and the image forming apparatus 104 executes a login process. A button 1201 is used to close the notice screen and proceed to the next process. An area 1202 displays an image and a message. A cancel button 1203 is used to stop the processing.

FIG. 12B is another example of a screen displayed by the application 401 in a case where the notice screen is currently displayed on the image forming apparatus 104. This screen displays a message 1211 indicating that a user operation on the image forming apparatus 104 is required, a "Yes" button 1212 for continuing the automatic control, and a "No" button 1213 for suspending the automatic control. The application 401 may perform display for prompting the user to confirm the screen displayed on the image forming apparatus 104. In this manner, if a screen that does not automatically transition, such as the notice screen, is currently displayed on the image forming apparatus 104, the application 401 notifies the user that a user operation is required.

FIG. 12C is an example of a screen indicating the execution status of the job. For example, this screen is displayed after the "execute job" button 1265 is pressed. An area 1221 displays the current execution status of the job using a message and an image. A button 1222 is used to send a cancellation request to suspend the automatic control to the image forming apparatus 104 by a user operation.

FIG. 12D is an example of a screen including a message indicating the status of the image forming apparatus 104 in addition to the execution status of the job. This screen displays a message 1231 received from the image forming apparatus 104 in step S818 (described below).

FIG. 12E is an example where the same screen as a screen displayed on the image forming apparatus 104 is displayed using VNC in the process of step S810 (described below). The same screen as the screen of the operation assistance information in FIG. 13E is displayed in this example. That is, the user can operate the image forming apparatus 104 on the application 401. An OK button 1242 is a button for finalizing the settings and continuing the processing of the job. A cancel button 1243 is a button for cancelling the processing.

FIG. 12F is an example of a screen displayed in step S821 (described below), and this screen is displayed if web content cannot be accessed. An area 1251 indicates that content to be displayed cannot be accessed. A button 1252 is used to close this screen.

FIGS. 8A and 8B are a flowchart illustrating a job execution instruction process executed by the data processing apparatus 101 according to the present exemplary embodiment. The flowchart in FIGS. 8A and 8B is implemented by the CPU 202 of the data processing apparatus 101 loading programs for achieving the control modules stored in the ROM 203 or the storage device 209 into the RAM 204 and executing the programs. The flowchart in FIGS. 8A and 8B corresponds to the processing performed by the data processing apparatus 101 in the sequence diagram in FIG. 7.

In step S801, based on an operation of the user on a screen of the application 401, the UI control unit 402 receives the input of connection information (e.g., an IP address) for connecting to the image forming apparatus 104 to which an execution instruction to execute a job is to be given. The information for connecting to the image forming apparatus 104 needs not be input by the user. Alternatively, the UI control unit 402 may search for the image forming apparatus 104 connected to the network 103 using the wireless LAN communication unit 212, or may acquire the information from the image forming apparatus 104 via the NFC communication unit 210 or the BLE communication unit 211. In the subsequent steps, the UI control unit 402 communicates with the image forming apparatus 104 using the information received in step S801.

In step S802, based on an operation of the user on the screen of the application 401, the UI control unit 402 receives settings for generating job information. Specifically, the UI control unit 402 receives various settings from the user on the screen in FIG. 12G. The job information includes an application to be executed by the image forming apparatus 104, the setting values of the job, and information necessary for the image forming apparatus 104 to execute the job, such as authentication information.

In step S803, based on the reception of a predetermined operation from the user, the MFP control unit 403 transmits the job information including the settings received in step S802 as a job execution request to the image forming apparatus 104. The "predetermined operation" is, for example, the pressing of the "execute job" button 1265.

In step S804, the MFP control unit 403 receives a job execution response as a response to the job execution request in step S803 from the image forming apparatus 104. In step S805, the MFP control unit 403 determines the content of the job execution response. If the content of the job execution response indicates success (YES in step S805), the processing proceeds to step S806. If not (NO in step S805), the processing proceeds to step S830.

In step S806, the MFP control unit 403 transmits an execution status acquisition request to acquire the execution status of the job to the image forming apparatus 104. In step S807, the MFP control unit 403 receives an execution status acquisition response as a response to the execution status acquisition request in step S806 from the image forming apparatus 104.

In step S808, based on the execution status acquisition response received in step S807, the MFP control unit 403 determines whether waiting for a user operation occurs in the image forming apparatus 104. Specifically, the MFP control unit 403 determines whether the image forming apparatus 104 executes a step in which the column 607 is "NO" in FIGS. 6A and 6B, and whether the automatic control is stopped. If waiting for a user operation occurs (YES in step S808), the processing proceeds to step S809. If not (NO in step S808), the processing proceeds to step S817.

In step S809, based on the execution status acquisition response received in step S807, the MFP control unit 403 determines the type of the response. Specifically, the MFP control unit 403 determines whether the type of the response is "VNC" or "URL" defined in the column 609 in FIGS. 6A and 6B. If a URL is included in the execution status acquisition response, it is determined that the type of the response is "URL" (URL in step S809), and the processing proceeds to step S811. If a VNC connection instruction and information necessary for a VNC connection are included in the execution status acquisition response, it is determined that the type of the response is "VNC" (VNC in step S809), and the processing proceeds to step S810.

In step S810, the data processing apparatus 101 connects to the image forming apparatus 104 with VNC using a remote framebuffer (RFB) protocol, and the UI control unit 402 displays the same screen as a screen displayed on the operation unit 307 of the image forming apparatus 104. The user can remotely operate the image forming apparatus 104. The VNC connection may be automatically executed, or an inquiry is made to the user, and if the VNC connection is permitted, the data processing apparatus 101 may connect to the image forming apparatus 104. If the operation with VNC is completed, the processing returns to step S806 to acquire the next execution status.

In step S811, the UI control unit 402 attempts to access a server using the URL included in the response acquired in step S807. If the attempt is successful (YES in step S811), the processing proceeds to step S812. If the attempt fails (NO in step S811), the processing proceeds to step S821.

In step S812, the UI control unit 402 accesses the URL acquired in step S807 and displays web content on the display 214 of the data processing apparatus 101 (FIG. 12A). In this case, a WebView function built into the application 401 is used. Thus, the web content may be any content that can be displayed by WebView. Specifically, the content may not only be an image in the HyperText Markup Language (HTML) format, but also be an image in the Joint Photographic Experts Group (JPEG) or Portable Network Graphics (PNG) format.

In step S821, the UI control unit 402 displays on the display 214 of the data processing apparatus 101 a message indicating that the content cannot be displayed. Specifically, the UI control unit 402 displays the screen in FIG. 12F. Alternatively, the UI control unit 402 may display the screen in FIG. 12B to prompt the user to view the screen displayed on the operation unit 307 of the image forming apparatus 104.

In step S813, the UI control unit 402 waits for a user operation on the touch panel 215 of the data processing apparatus 101.

In step S814, if a user operation is not performed for a certain time (TIMEOUT in step S814), the processing returns to step S806. If a received user operation is an operation for continuing the processing (CONTINUE PROCESSING in step S814), the processing proceeds to step S815. If a received user operation is an operation for cancelling the processing (CANCEL PROCESSING in step S814), the processing proceeds to step S822. Specifically, if the button 1201 is selected on the screen in FIG. 12A, the processing proceeds to step S815. If the button 1203 is selected, the processing proceeds to step S822.

In step S815, the MFP control unit 403 transmits to the image forming apparatus 104 an operation request including a message that the processing of the job in the image forming apparatus 104 is to be continued. On the other hand, in step S822, the MFP control unit 403 transmits to the image forming apparatus 104 an operation request including that the processing of the job in the image forming apparatus 104 is to be cancelled (hereinafter, a "cancellation request").

In step S816, the MFP control unit 403 receives an operation response as a response to the operation request in step S815 or S822 from the image forming apparatus 104. The operation response includes the success or failure of the operation request and the current execution status of the automatic control in the image forming apparatus 104.

In step S817, the MFP control unit 403 determines whether message information is included in the execution status acquisition response received in step S807 or the operation response received in step S816. The image forming apparatus 104 can include in a response a message of which the user is be notified. If message information is included (YES in step S817), the processing proceeds to step S818. If message information is not included (NO in step S817), the processing proceeds to step S819.

In step S818, the UI control unit 402 displays the message information included in the response on the display 214. Specifically, the UI control unit 402 displays the message 1231 in FIG. 12D. For example, the UI control unit 402 may display a message displayed on the operation panel of the image forming apparatus 104, such as a message regarding the currently executed job or a message notifying the user that a document is forgotten to be removed.

In step S819, based on the execution status acquisition response received in step S807, the UI control unit 402 displays information for the user to know the execution status of the job on the display 214. Specifically, the UI control unit 402 displays the screen in FIG. 12C. The screen is displayed based on screen information included in advance in the application 401.

In step S820, if the execution status acquisition response received in step S807 indicates that the execution of the job is completed (YES in step S820), the flowchart ends. If not (NO in step S820), the processing returns to step S806. In step S830, the UI control unit 402 displays on the display 214 a message indicating that the execution instruction to execute the job is an error, and the flowchart ends.

By the processing of the above flowchart, even in a case where an image forming apparatus is instructed to execute a job from a data processing apparatus, a screen that is displayed on the image forming apparatus and is to be presented to a user is also displayed on the data processing apparatus. Although a configuration is employed in which a cancellation request to cancel the execution of the job in the image forming apparatus 104 is received only at a predetermined timing in the present exemplary embodiment, a configuration may be employed in which a cancellation request is received at any timing. For example, when the execution status is displayed in step S819, a cancel button may be displayed together with the execution status. Then, if the UI control unit 402 detects the pressing of the cancel button, the MFP control unit 403 may transmit a cancellation request to the image forming apparatus 104.

If it is determined in step S808 that waiting for a user operation occurs, the UI control unit 402 may display the screen in FIG. 12B for prompting the user to view the screen displayed on the operation unit 307 of the image forming apparatus 104.

Although an example has been illustrated where the content is displayed in step S812, the timing of the display is not limited to this.

For example, the content may be displayed at the timing when it is determined in step S805 that the content of the job execution response indicates success. Alternatively, the content may be displayed at the timing when the execution of the job is completed in step S820. Further, although an example has been illustrated where the web content is acquired using the URL and displayed in step S812, the web content itself may be acquired from the image forming apparatus 104 and displayed.

Figure 9:
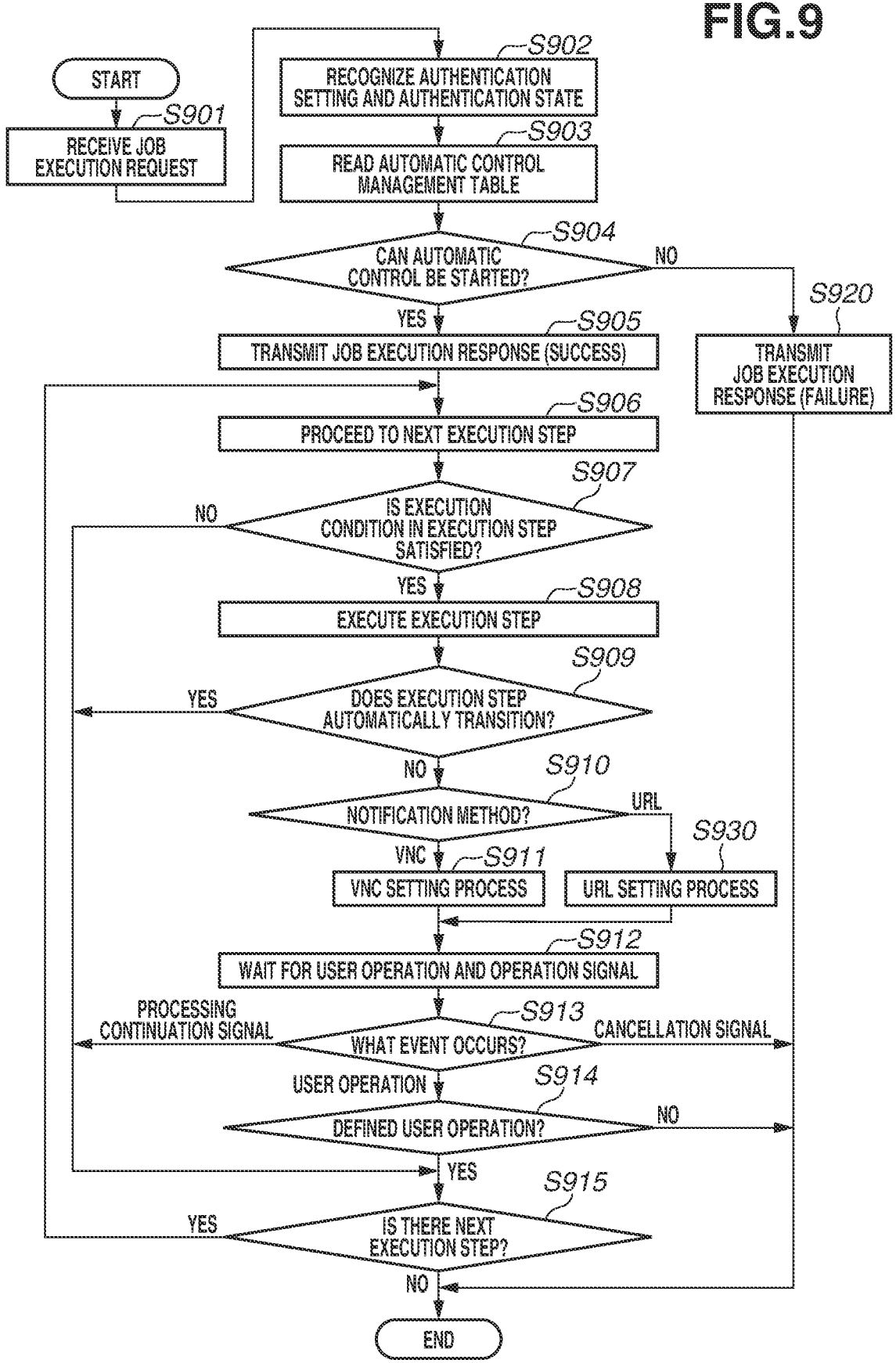
FIG. 9 is a flowchart illustrating a process of the image forming apparatus according to the first exemplary embodiment.

FIG. 9 is a flowchart illustrating an automatic control process performed by the image forming apparatus 104 according to the present exemplary embodiment. The flowchart in FIG. 9 is implemented by the CPU 302 of the image forming apparatus 104 loading programs for achieving the control modules stored in the ROM 304 or the HDD 305 into the RAM 303 and executing the programs. The flowchart in FIG. 9 corresponds to the processing performed by the image forming apparatus 104 in steps S701 to S705 in the sequence diagram in FIG. 7.

In step S901, the automatic control processing unit 504 receives a job execution request transmitted from the data processing apparatus 101 via the network 103. The job execution request is, for example, the information transmitted in step S803. In step S902, the authentication control unit 503 recognizes the authentication setting and the authentication state of the image forming apparatus 104. In step S903, the UI control unit 502 acquires information corresponding to the authentication setting and the authentication state recognized in step S902 as automatic control information from the automatic control management table 505. For example, if the authentication setting is "authentication necessary/display login screen when operation on device is started" and the authentication state is "unauthenticated", the UI control unit 502 reads the rows 617 to 624. Hereinafter, steps will be described using as an example a case where the UI control unit 502 reads the rows 617 to 624 as the automatic control information.

In step S904, the automatic control processing unit 504 determines whether the automatic control can be started. Specifically, the automatic control processing unit 504 executes a check process defined in the first execution step (a row in which the "execution step" column 603 indicates "0") in the automatic control read in step S903. If the condition is satisfied (YES in step S904), the processing proceeds to step S905. If not (NO in step S904), the processing proceeds to step S920. A specific example of the check process is described using the row 617 as an example. In the row 617, the "process" column 604 defines "screen check", and the "parameter" column 605 defines "login screen, job status screen". Thus, in step S904, the automatic control processing unit 504 checks whether a screen currently displayed on the operation unit 307 is a login screen or a job status screen. If the screen currently displayed on the operation unit 307 is the login screen or the job status screen, the automatic control processing unit 504 determines that the condition is satisfied.

In step S905, as a response to the job execution request received in step S901, the automatic control processing unit 504 transmits to the data processing apparatus 101 a job execution response including information indicating that the job execution request is successful. In step S906, the automatic control proceeds to the next execution step. In step S907, the automatic control processing unit 504 determines whether the execution step as the processing target satisfies the execution condition in the "execution condition" column 606. If the execution condition is satisfied (YES in step S907), the processing proceeds to step S908. If not (NO in step S907), the processing proceeds to step S915. In step S908, the automatic control processing unit 504 performs the process defined in the "process" column 604 in the execution step as the processing target, using the information in the "parameter" column 605. Specific examples of the processes of steps S907 and S908 are described using the row 618 as an example. In the row 618, the "execution condition" column 606 defines "currently displayed screen!=login screen". Thus, if the screen currently displayed on the operation unit 307 of the image forming apparatus 104 is other than the login screen, the automatic control processing unit 504 determines in step S907 that the execution condition is satisfied. Then, in step S908, based on "screen display" in the "process" column 604 and "login screen" in the "parameter" column 605, the UI control unit 502 performs the process of displaying the login screen for inputting authentication information.

In the case of the row 621, if the display timing of the notice screen in the image forming apparatus 104 is set such that the notice screen is displayed after login, it is determined in step S907 that the execution condition is satisfied. Then, in step S908, the automatic control processing unit 504 requests the UI control unit 502 to display the notice screen (e.g., FIG. 13D), and the UI control unit 502 displays the notice screen on the operation unit 307 of the image forming apparatus 104. Further, if the execution step as the processing target is the row 625, the "process" column 604 defines "job execution", and the "parameter" column 605 defines "job execution request: job settings". In this case, the automatic control processing unit 504 requests the job control unit 506 to execute a job using job settings included in the job execution request received in step S901.

The description returns to the flowchart. In step S909, using the value of the "automatic transition" column 607, the automatic control processing unit 504 determines whether the execution step as the processing target automatically transitions. If the "automatic transition" column 607 indicates "YES" (YES in step S909), the processing proceeds to step S915. If the "automatic transition" column 607 indicates "NO" (NO in step S909), the processing proceeds to step S910.

In step S910, the automatic control processing unit 504 confirms the notification method defined in the "notification method" column 609 in the execution step as the processing target. If the notification method is "VNC" (VNC in step S910), the processing proceeds to step S911. If the notification method is "URL" (URL in step S910), the processing proceeds to step S930.

In step S911, the automatic control processing unit 504 performs a preparation operation and a setting process for a VNC connection. For example, the automatic control processing unit 504 performs a preparation process for starting the image forming apparatus 104 as a VNC server, and a preparation process for including information necessary for a VNC connection in an execution status acquisition response to be transmitted to the data processing apparatus 101.

In step S930, to include URL information in an execution status acquisition response to be transmitted to the data processing apparatus 101, the automatic control processing unit 504 acquires a URL for accessing the currently displayed content.

In step S912, the automatic control processing unit 504 waits for a user operation on the operation unit 307 of the image forming apparatus 104 and an operation signal from the data processing apparatus 101 executing the processing asynchronously. If the automatic control processing unit 504 detects either of a user operation and an operation signal, the processing proceeds to step S913.

In step S913, the automatic control processing unit 504 determines the type of the event detected in step S912. If the event is a user operation on the operation unit 307 (USE OPERATION in step S913), the processing proceeds to step S914. If the event is a processing continuation signal (PROCESSING CONTINUATION SIGNAL in step S913), the processing proceeds to step S915. If the event is a cancellation signal (CANCELLATION SIGNAL in step S913), the flowchart ends. The processing continuation signal and the cancellation signal will be described below with reference to FIG. 11.

In step S914, the automatic control processing unit 504 determines whether the user operation detected in step S912 is the operation defined in the "user operation" column 608 in the execution step. If the user operation is the operation defined in the "user operation" column 608 in the execution step (YES in step S914), the processing proceeds to step S915. If not (NO in step S914), the flowchart ends. Then, the automatic control processing unit 504 suspends the automatic control.

In step S915, the automatic control processing unit 504 determines whether there is a next execution step. If there is a next execution step (YES in step S915), the processing proceeds to step S906. If not (NO in step S915), the flowchart ends.

In step S920, as a response to the job execution request received in step S901, the automatic control processing unit 504 transmits to the data processing apparatus 101 a job execution response including information indicating that the job execution request fails. Then, the flowchart ends.

Alternatively, a configuration may be employed in which the automatic control can be suspended at a timing other than steps S914 and S913. For example, if screen transition or logout occurs in response to a user operation, the flowchart may end. A trigger for suspending the automatic control may be other than a user operation. For example, if it is detected that the image forming apparatus 104 becomes unable to perform network communication with the data processing apparatus 101, the flowchart may end.

By the above processing, an image forming apparatus having received job information from a data processing apparatus can automatically execute steps, and in a predetermined step, the image forming apparatus can stop automatic control and wait for a user operation or an instruction from the data processing apparatus.

If the execution step does not automatically transition in step S909, then in step S912, the automatic control processing unit 504 waits for a user operation and a signal. If, however, the notification method is set, and the data processing apparatus 101 can display a corresponding screen, the process of step S912 may be skipped, and the processing may automatically proceed to the next step. Consequently, if the data processing apparatus 101 can display the screen displayed on the image forming apparatus 104, the image forming apparatus 104 can automatically perform screen transition. Thus, it is not necessary to stop the processing.

FIG. 10 is a flowchart illustrating a process executed in response to an execution status acquisition request by the image forming apparatus 104 according to the present exemplary embodiment. The flowchart in FIG. 10 is implemented by the CPU 302 of the image forming apparatus 104 loading programs for achieving the control modules stored in the ROM 304 or the HDD 305 into the RAM 303 and executing the programs. The flowchart in FIG. 10 corresponds to the processing performed by the image forming apparatus 104 in steps S710 and S711 in the sequence diagram in FIG. 7. The processing of the flowchart in FIG. 9 and the processing of the flowchart in FIG. 10 are executed asynchronously.

In step S1001, the automatic control processing unit 504 receives an execution status acquisition request transmitted from the data processing apparatus 101 via the network 103. The execution status acquisition request is, for example, the request transmitted from the data processing apparatus 101 in step S806.

In step S1002, the automatic control processing unit 504 acquires the execution status of a job. The "execution status" is, for example, the progress status of the execution steps in the automatic control in the automatic control management table 505, information regarding the currently executed process, information indicating whether a user operation is waited for, and information indicating whether the automatic control is completed. Additionally, the execution status also includes information for the data processing apparatus 101 to display information corresponding to the execution status, specifically, the information in the "notification method" column 609 in FIGS. 6A and 6B corresponding to the current execution status. The information is, for example, information such as a URL for the data processing apparatus 101 to display the notice screen, information for the data processing apparatus 101 to display the operation assistance information displayed on the image forming apparatus 104, using a VNC function, or message information. That is, the execution status of the job also includes the information necessary for a VNC connection set in step S911 and the URL information acquired in step S930.

In step S1003, as a response to the execution status acquisition request received in step S1001, the automatic control processing unit 504 transmits the execution status of the automatic control acquired in step S1002 as an execution status acquisition response to the data processing apparatus 101.

By the above processing, information for the data processing apparatus 101 to display a screen or information displayed on the image forming apparatus 104 can be transmitted to the data processing apparatus 101 having given an execution instruction to execute a job. Only in a case where a predetermined screen for which the "automatic transition" column 607 in FIGS. 6A and 6B indicates "NO" (the notice screen) is displayed, the image forming apparatus 104 transmits information for the data processing apparatus 101 to display the screen to the data processing apparatus 101. That is, only in a case where a screen including content of which the user is be notified is displayed on the image forming apparatus 104, the data processing apparatus 101 can display the screen, and the data processing apparatus 101 does not display an unnecessary screen. Thus, for example, if the authentication setting of the image forming apparatus 104 is "authentication unnecessary", there is not a screen for which the "automatic transition" column 607 indicates "NO". Thus, the process of displaying on the data processing apparatus 101 the screen currently displayed on the image forming apparatus 104 is not executed.

FIG. 11 is a flowchart illustrating a process executed in response to an operation request by the image forming apparatus 104 according to the present exemplary embodiment. The flowchart in FIG. 11 is implemented by the CPU 302 of the image forming apparatus 104 loading programs for achieving the control modules stored in the ROM 304 or the HDD 305 into the RAM 303 and executing the programs.

In step S1101, the automatic control processing unit 504 receives an operation request transmitted from the data processing apparatus 101 via the network 103. The operation request is, for example, the request transmitted from the data processing apparatus 101 in step S815 or S822. The processing of the flowchart in FIG. 11 and the processing of the flowchart in FIG. 9 are executed asynchronously.

In step S1102, the automatic control processing unit 504 determines the content of the operation request transmitted from the data processing apparatus 101. If the content of the operation request is the continuation of the processing (CONTINUE PROCESSING in step S1102), the processing proceeds to step S1103. If the content of the operation request is the cancellation of the processing (CANCEL PROCESSING in step S1102), the processing proceeds to step S1104. If the content of the request is other than the continuation and the cancellation of the processing (OTHERWISE in step S1102), the processing proceeds to step S1110.

In step S1103, the automatic control processing unit 504 notifies an automatic control process that is being executed asynchronously (the flowchart in FIG. 9) of a continuation signal as an operation signal. A "signal" is a method for notifying a process that is being executed asynchronously of information.

In step S1104, the automatic control processing unit 504 notifies the automatic control process that is being executed asynchronously (the flowchart in FIG. 9) of a cancellation signal as an operation signal.

In step S1105, as a response to the operation request received in step S1101, the automatic control processing unit 504 transmits the current execution status of the automatic control process and information indicating that the operation request is successful, as an execution status acquisition response to the data processing apparatus 101.

In step S1110, as a response to the operation request received in step S1101, the automatic control processing unit 504 transmits the current execution status of the automatic control process and information indicating that the operation request fails, as an execution status acquisition response to the data processing apparatus 101.

In the above exemplary embodiment, an example has been illustrated where the notice screen in FIG. 13D displayed on the image forming apparatus 104 or the display screen of the operation assistance information in FIG. 13E is displayed on the data processing apparatus 101. A screen to be displayed is not limited to this, and may be the home screen in FIG. 13A or the screen of the job in execution in FIG. 13C. In this case, the image forming apparatus 104 transmits screen information to the data processing apparatus 101.

By the processing of the above exemplary embodiment, even in a case where a user executes a job in an image forming apparatus by operating a data processing apparatus, a message to the user displayed on the image forming apparatus is displayed on the data processing apparatus. Thus, the user does not miss the message, and does not need to view both the screen of the data processing apparatus and the screen of the image forming apparatus.

According to the above exemplary embodiment, even in a case where an execution instruction to execute a job is given to an apparatus from a terminal, a user operating the terminal can confirm a screen displayed on the apparatus.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-196730, filed Dec. 3, 2021, which is hereby incorporated by reference herein in its entirety.

What is claimed is:

1. An image forming apparatus that has an image forming function and communicates with a terminal, the image forming apparatus comprising:
   a memory storing instructions; and
   at least one processor executing the instructions causing the image forming apparatus to:
      receive from the terminal an image forming job including an execution instruction to execute the image forming job using the image forming function and setting information regarding the image forming function;
      execute an image forming process based on the received image forming job; and
      execute both a process of displaying a predetermined screen on a display unit of the image forming apparatus and a process of transmitting, to the terminal, information for causing the terminal to display the predetermined screen displayed on the display unit in a case where the image forming job is received,
   wherein a timing when the predetermined screen is displayed on the display unit of the image forming apparatus and a timing when the predetermined screen is displayed based on the information for causing the terminal to display the predetermined screen are different from each other.

2. The image forming apparatus according to claim 1, wherein the predetermined screen is a screen including information of which a user is to be notified in a case where the image forming job is executed based on the execution instruction to execute the image forming job.

3. The image forming apparatus according to claim 1, wherein the predetermined screen is a screen to be displayed upon completion of a login process by the image forming apparatus.

4. The image forming apparatus according to claim 1, wherein the predetermined screen is a web content screen.

5. The image forming apparatus according to claim 1, wherein the information is a Uniform Resource Locator (URL).

6. The image forming apparatus according to claim 1, wherein the information is information necessary for a Virtual Network Computing (VNC) connection.

7. The image forming apparatus according to claim 1, wherein screens to be displayed on the display unit transition in sequence upon receiving the image forming job from the terminal, and the screens to be transitioned include the predetermined screen.

8. The image forming apparatus according to claim 1, wherein in a case where the predetermined screen is not displayed on the display unit, the information is not transmitted to the terminal.

9. The image forming apparatus according to claim 1, wherein the image forming apparatus is an apparatus at least having a print function and a scan function, and the execution instruction to execute the image forming job is an execution instruction to execute a job using the print function or the scan function.

10. The image forming apparatus according to claim 1, wherein the predetermined screen is a notice screen for an administrator of the image forming apparatus to display content of which a user of the image forming apparatus is to be notified.

11. The image forming apparatus according to claim 1, wherein the predetermined screen is set as a screen that does not automatically transition.

12. An image forming system comprising:
a terminal; and
an image forming apparatus,
wherein the image forming apparatus comprises:
a memory storing instructions; and
at least one processor executing the instructions causing the image forming apparatus to:
receive from the terminal an image forming job including an execution instruction to execute a job using an image forming function of the image forming apparatus and setting information regarding the image forming function;
execute an image forming process based on the received image forming job; and
execute both a process of displaying a predetermined screen on a display unit of the image forming apparatus and a process of transmitting, to the terminal, information for causing the terminal to display the predetermined screen displayed on the display unit in a case where the image forming job is received, and
wherein the terminal comprises:
a memory storing instructions; and
at least one processor executing the instructions causing the terminal to:
transmit the image forming job to the image forming apparatus; and
display the predetermined screen based on the information transmitted from the image forming apparatus,
wherein a timing when the predetermined screen is displayed on the display unit of the image forming apparatus and a timing when the predetermined screen is displayed based on the information for causing the terminal to display the predetermined screen are different from each other.

13. The image forming system according to claim 12, wherein the predetermined screen is a screen including information of which a user is to be notified in a case where the job is executed based on the execution instruction to execute the job.

14. The image forming system according to claim 12, wherein the predetermined screen is a screen to be displayed upon completion of a login process by the image forming apparatus.

15. The image forming system according to claim 12, wherein the screen displayed on the display unit of the image forming apparatus is a web content screen.

16. The image forming system according to claim 12, wherein the information is a Uniform Resource Locator (URL).

17. The image forming system according to claim 12, wherein the information is information necessary for a Virtual Network Computing (VNC) connection.

18. A control method executed by an image forming apparatus that has an image forming function and communicates with a terminal, the control method comprising:
receiving from the terminal an image forming job including an execution instruction to execute the image forming job using the image forming function and setting information regarding the image forming function;
executing an image forming process based on the received image forming job; and
executing both a process of displaying a predetermined screen on a display unit of the image forming apparatus and a process of transmitting, to the terminal, information for causing the terminal to display the predetermined screen displayed on the display unit in a case where the image forming job is received,
wherein a timing when the predetermined screen is displayed on the display unit of the image forming apparatus and a timing when the predetermined screen is displayed based on the information for causing the terminal to display the predetermined screen are different from each other.

19. A non-transitory computer-readable storage medium that stores one or more programs including instructions, which when executed by one or more processors of the image forming apparatus, cause the image forming apparatus to perform the control method according to claim 18.

* * * * *